United States Patent
Choi

(10) Patent No.: US 10,057,334 B2
(45) Date of Patent: Aug. 21, 2018

(54) QUAD FULL MESH AND DIMENSION DRIVEN NETWORK ARCHITECTURE

(71) Applicant: Futurewei Technologies, Inc., Plano, TX (US)

(72) Inventor: Byung Choi, Fremont, CA (US)

(73) Assignee: Futurewei Technologies, Inc., Plano, TX (US)

(*) Notice: Subject to any disclaimer, the term of this patent is extended or adjusted under 35 U.S.C. 154(b) by 96 days.

(21) Appl. No.: 15/351,247

(22) Filed: Nov. 14, 2016

(65) Prior Publication Data

US 2018/0139267 A1    May 17, 2018

(51) Int. Cl.
*H04W 4/00*    (2018.01)
*H04L 29/08*    (2006.01)
*H04L 29/06*    (2006.01)
*H04L 29/12*    (2006.01)

(52) U.S. Cl.
CPC .......... *H04L 67/10* (2013.01); *H04L 61/2007* (2013.01); *H04L 61/6022* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,230,252 B1 | 5/2001 | Passint et al. | |
| 8,433,816 B2 | 4/2013 | Deneroff et al. | |
| 8,510,535 B2 | 8/2013 | Deng et al. | |
| 9,104,639 B2 | 8/2015 | Koritnik et al. | |
| 9,330,230 B2 | 5/2016 | Archer et al. | |
| 9,336,179 B2 | 5/2016 | Liu et al. | |
| 9,900,672 B2* | 2/2018 | Rickman | H04Q 11/0005 |
| 2002/0090007 A1 | 7/2002 | Kamiya et al. | |
| 2004/0133619 A1* | 7/2004 | Zelig | H04L 12/4641 |
| | | | 709/200 |

(Continued)

FOREIGN PATENT DOCUMENTS

| | | |
|---|---|---|
| CN | 103597789 A | 2/2014 |
| CN | 106055563 A | 10/2016 |

OTHER PUBLICATIONS

Yang, Xiaowei, "Lecture 15: Datacenter Network: Topology and Routing," Center for Networked Systems, Nov. 2010, 70 pages.

(Continued)

*Primary Examiner* — Otis L Thompson, Jr.
(74) *Attorney, Agent, or Firm* — Vierra Magen Marcus LLP

(57) ABSTRACT

A data center network architecture and method for communicating data are provided. The nodes and communication links in the network are arranged according to N dimensions. Groups of four nodes are arranged initially in quad full mesh networks. In each dimension, each node has three connections to other nodes. In particular, in each dimension, the nodes can be arranged in quarters, where a node in one quarter is connected to a node in each of three other quarters. In each dimension, the maximum number of hops between a sending node and a destination node is N. Due to the dimensionality, the nodes and communication links can be easily classified into different service levels, and diagnosis of problems is facilitated.

21 Claims, 17 Drawing Sheets

(56) References Cited

U.S. PATENT DOCUMENTS

| | | | | |
|---|---|---|---|---|
| 2009/0310610 | A1* | 12/2009 | Sandstrom | H04L 45/00 370/392 |
| 2010/0061231 | A1* | 3/2010 | Harmatos | H04L 45/02 370/228 |
| 2010/0284302 | A1* | 11/2010 | Proulx | H04L 41/0806 370/254 |
| 2012/0127855 | A1* | 5/2012 | Alon | H04L 12/413 370/218 |
| 2014/0036910 | A1* | 2/2014 | Agmon | H04L 45/50 370/389 |
| 2014/0098810 | A1 | 4/2014 | Frey et al. | |
| 2014/0229633 | A1 | 8/2014 | Bent et al. | |
| 2014/0301241 | A1* | 10/2014 | Kumar | H04L 49/109 370/254 |
| 2015/0341286 | A1 | 11/2015 | Choi | |
| 2017/0139606 | A1* | 5/2017 | De | G06F 3/061 |

OTHER PUBLICATIONS

Thakyal, Deewakar, et al., "DIA-TORUS: A Novel Topology for Network on Chip Design," International Journal of Computer Networks & Communications, vol. 8, No. 3, May 2016, 12 pages.

Abts, Dennis, et al., "A good user experience depends on predictable performance within the data-center network," A Guided Tour through Data-center Networking—ACM Queue, vol. 10, Issue 5, May 3, 2012, [downloaded from http://queue.acm.org/detail.cfm?id=2208919 on Aug. 12, 2016], 23 pages.

Veeraraghavan, Malathi, et al., "Data Center Networking," IEEE ANTS 2012 Tutorial, The Hong Kong University of Science and Technology, Feb. 2013, 97 pages.

"Data Center Architecture Overview," Chapter 1, Cisco Data Center Infrastructure 2.5 Design Guide, Nov. 2011, 10 pages.

Habib, Shaista, et al., "Routing Techniques in Data Center Networks," Handbook on Data Centers, Feb. 2015, 26 pages.

Hospodor, Andy D., et al., "Interconnection Architectures for Petabyte-Scale High-Performance Storage Systems," 21st IEEE / 12th NASA Goddard Conference on Mass Storage Systems and Technologies, Apr. 2004, 9 pages.

Khosravi, Atefeh, et al., "Hyper Node Torus: A New interconnection Network for High Speed Packet Processors," 2011 International Symposium on Computer Networks and Distributed Systems (CNDS), Feb. 2011, 5 pages.

Khan, Mohammad Ayoub, et al., "A Review of Hyper-Torus based Topologies for Network-on-Chip," Proceedings of International Conference Emerging Trends in Computing, Mar. 2011, 7 pages.

Wang, Guohui, et al., "Your Data Center Is a Router: The Case for Reconfigurable Optical Circuit Switched Paths," Carnegie Mellon University, Computer Science Dept., May 2015, 8 pages.

Mahgoub, Imad, et al., "Evaluation of memory latency in cluster-based cache-coherent multiprocessor systems with different interconnection topologies," Computers and Electrical Engineering, Apr. 2010, 14 pages.

Aliee et al., A Quad Router Design for Next-Generation CMPs, IEEE 2010. pp. 123-128.

PCT/CN2017/109554, ISR, dated Jan. 29, 2018.

* cited by examiner

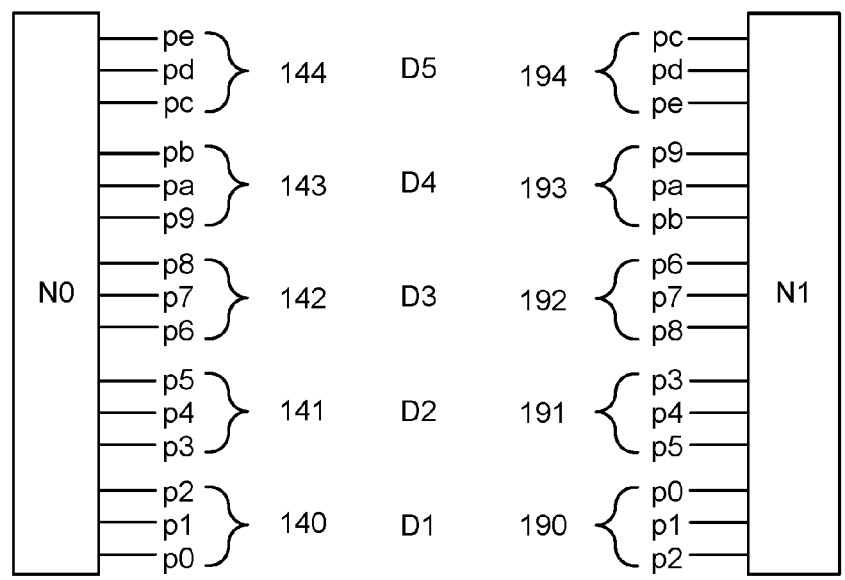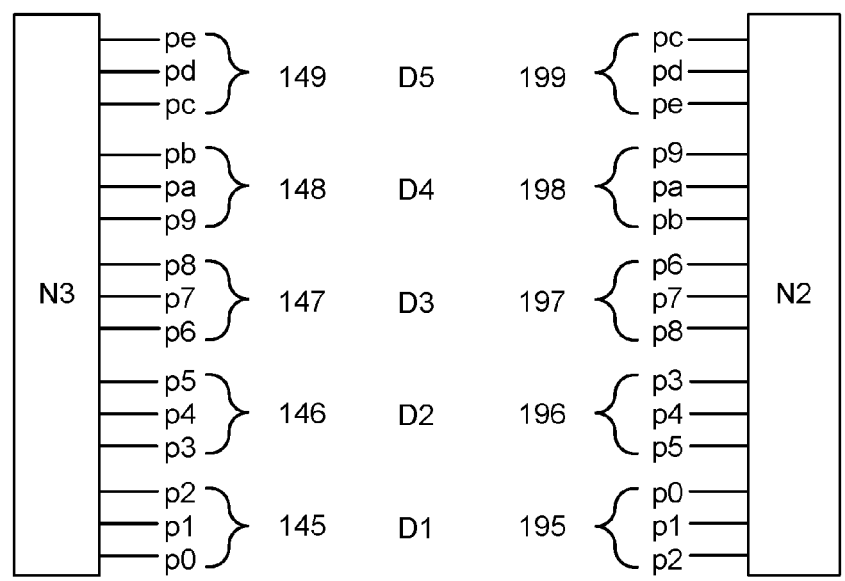
Fig. 1C

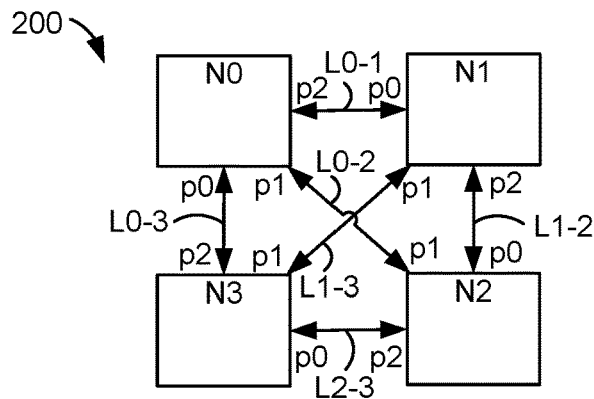
Fig. 2A
```
            1D example
            nodes          ports
220a →     x.x.x.x.0:1    x.x.x.x.2:0    ← 220b
           x.x.x.x.0:2    x.x.x.x.1:1
           x.x.x.x.0:3    x.x.x.x.0:2
           x.x.x.x.1:0    x.x.x.x.0:2
           x.x.x.x.1:2    x.x.x.x.2:0
           x.x.x.x.1:3    x.x.x.x.1:1
           x.x.x.x.2:0    x.x.x.x.1:1
           x.x.x.x.2:1    x.x.x.x.0:2
           x.x.x.x.2:3    x.x.x.x.2:0
           x.x.x.x.3:0    x.x.x.x.2:0
           x.x.x.x.3:1    x.x.x.x.1:1
           x.x.x.x.3:2    x.x.x.x.0:2
```
Fig. 2B
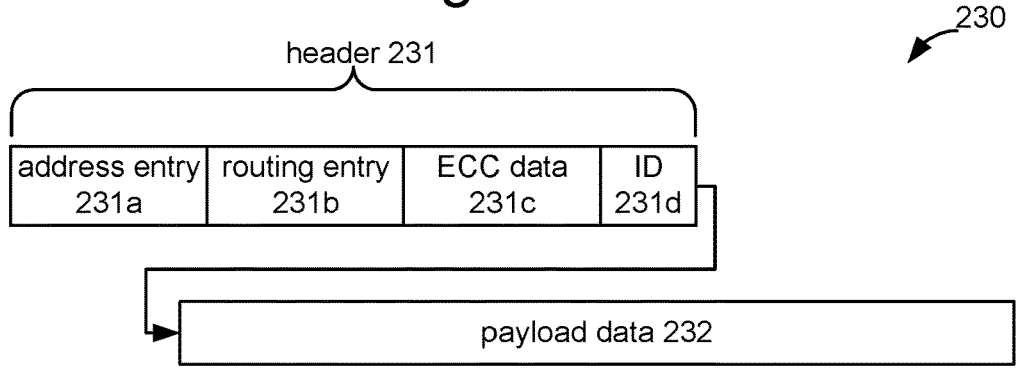
Fig. 2C

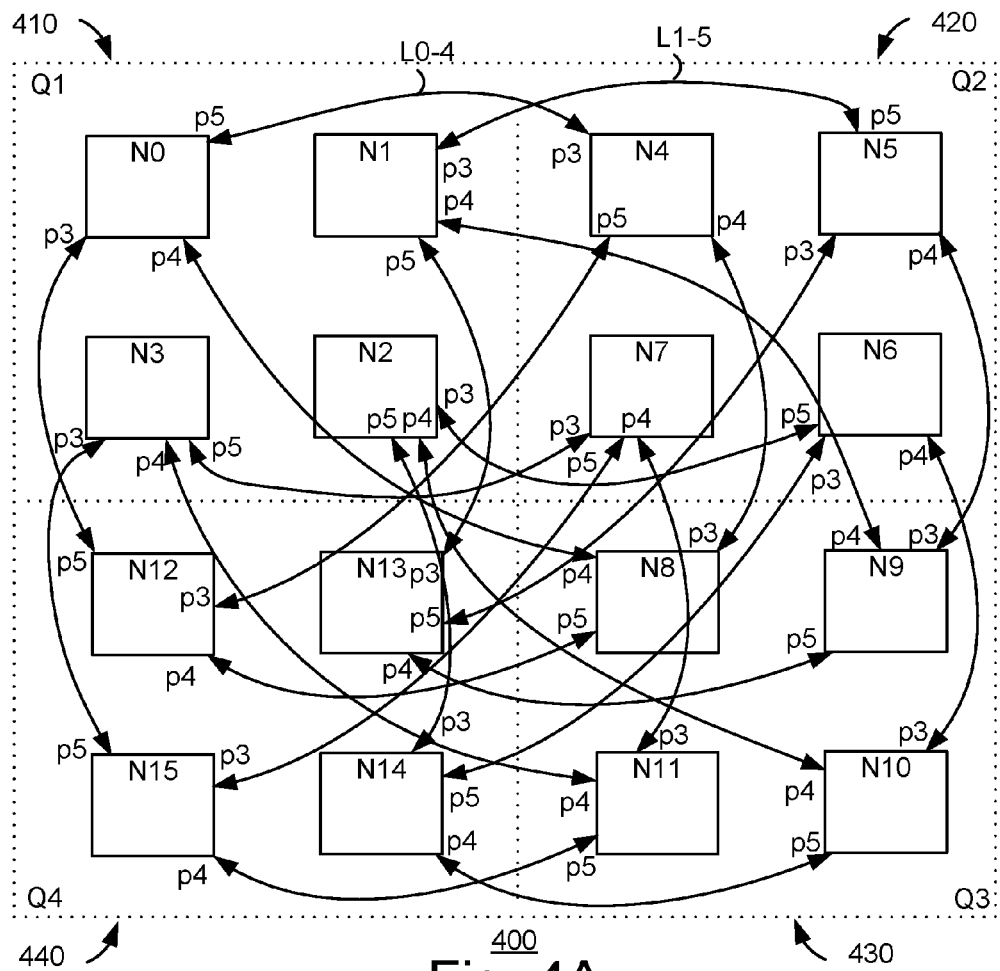

Fig. 4A

| 2D example | |
|---|---|
| nodes | ports |
| x.x.x.0:4.x | x.x.x.5:3.x |
| x.x.x.0:8.x | x.x.x.4:4.x |
| x.x.x.0:12.x | x.x.x.3:5.x |
| | |
| x.x.x.1:5.x | x.x.x.3:5.x |
| x.x.x.1:9.x | x.x.x.4:4.x |
| x.x.x.1:13.x | x.x.x.5:3.x |
| | |
| x.x.x.2:6.x | x.x.x.3:5.x |
| x.x.x.2:10.x | x.x.x.4:4.x |
| x.x.x.2:14.x | x.x.x.5:3.x |
| | |
| x.x.x.3:7.x | x.x.x.5:3.x |
| x.x.x.3:11.x | x.x.x.4:4.x |
| x.x.x.3:15.x | x.x.x.3:5.x |

Fig. 4B

| 2D example | |
|---|---|
| nodes | ports |
| x.x.x.4:0.x | x.x.x.3:5.x |
| x.x.x.4:8.x | x.x.x.4:3.x |
| x.x.x.4:12.x | x.x.x.5:3.x |
| | |
| x.x.x.5:1.x | x.x.x.5:3.x |
| x.x.x.5:9.x | x.x.x.4:3.x |
| x.x.x.5:13.x | x.x.x.3:5.x |
| | |
| x.x.x.6:2.x | x.x.x.5:3.x |
| x.x.x.6:10.x | x.x.x.4:3.x |
| x.x.x.6:14.x | x.x.x.3:5.x |
| | |
| x.x.x.7:3.x | x.x.x.3:5.x |
| x.x.x.7:11.x | x.x.x.4:3.x |
| x.x.x.7:15.x | x.x.x.5:3.x |

Fig. 4C

| 2D example | |
|---|---|
| nodes | ports |
| x.x.x.8:0.x | x.x.x.4:4.x |
| x.x.x.8:4.x | x.x.x.3:4.x |
| x.x.x.8:12.x | x.x.x.5:3.x |
| | |
| x.x.x.9:1.x | x.x.x.4:4.x |
| x.x.x.9:5.x | x.x.x.3:4.x |
| x.x.x.9:13.x | x.x.x.5:4.x |
| | |
| x.x.x.10:2.x | x.x.x.4:4.x |
| x.x.x.10:6.x | x.x.x.3:4.x |
| x.x.x.10:14.x | x.x.x.5:4.x |
| | |
| x.x.x.11:3.x | x.x.x.4:4.x |
| x.x.x.11:7.x | x.x.x.3:4.x |
| x.x.x.11:15.x | x.x.x.5:4.x |

Fig. 4D

| 2D example | |
|---|---|
| nodes | ports |
| x.x.x.12:0.x | x.x.x.5:3.x |
| x.x.x.12:4.x | x.x.x.3:5.x |
| x.x.x.12:8.x | x.x.x.4:5.x |
| | |
| x.x.x.13:1.x | x.x.x.3:5.x |
| x.x.x.13:5.x | x.x.x.5:3.x |
| x.x.x.13:9.x | x.x.x.4:5.x |
| | |
| x.x.x.14:2.x | x.x.x.3:5.x |
| x.x.x.14:6.x | x.x.x.5:3.x |
| x.x.x.14:10.x | x.x.x.4:5.x |
| | |
| x.x.x.15:3.x | x.x.x.5:3.x |
| x.x.x.15:7.x | x.x.x.3:5.x |
| x.x.x.15:11.x | x.x.x.4:5.x |

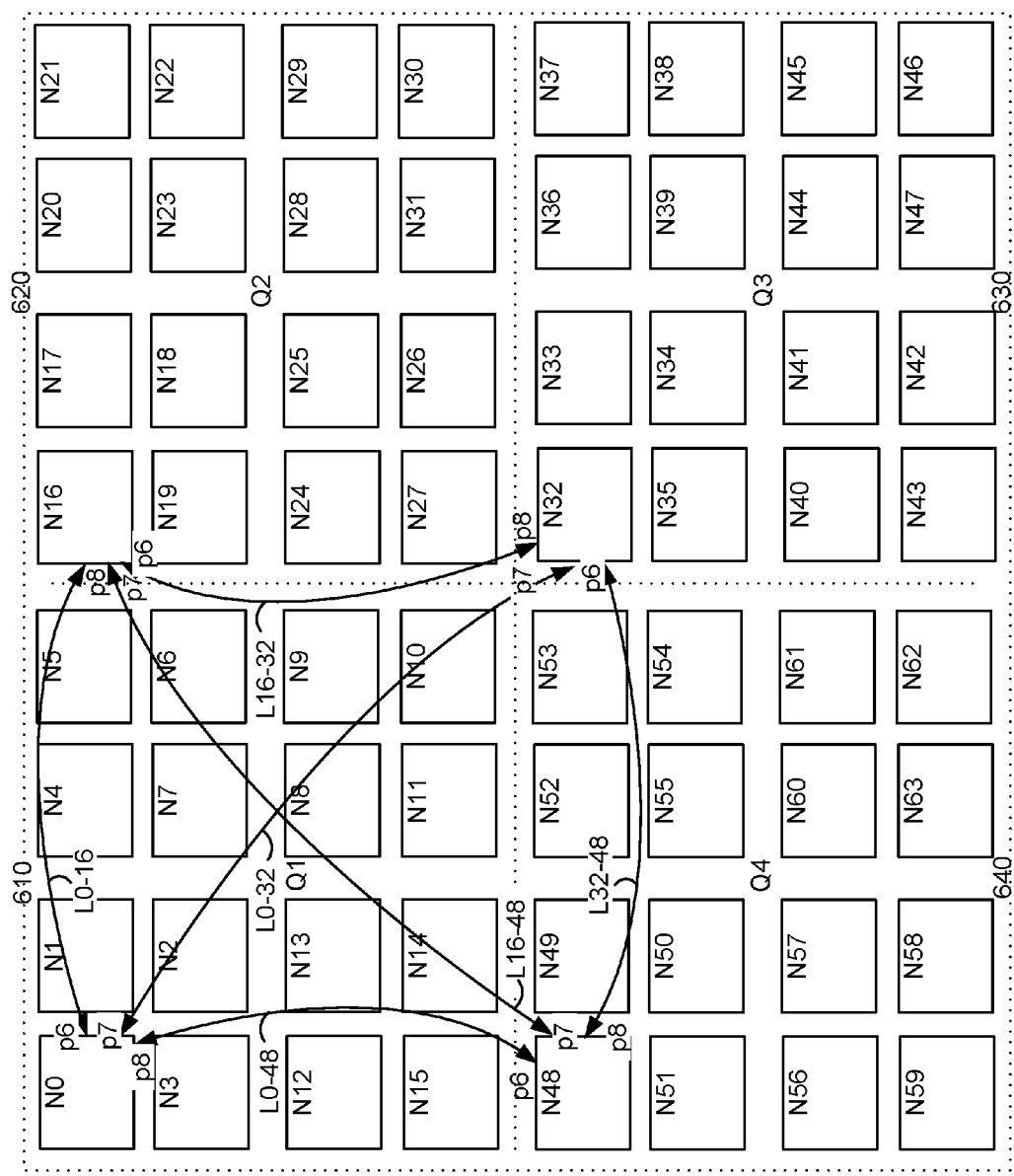

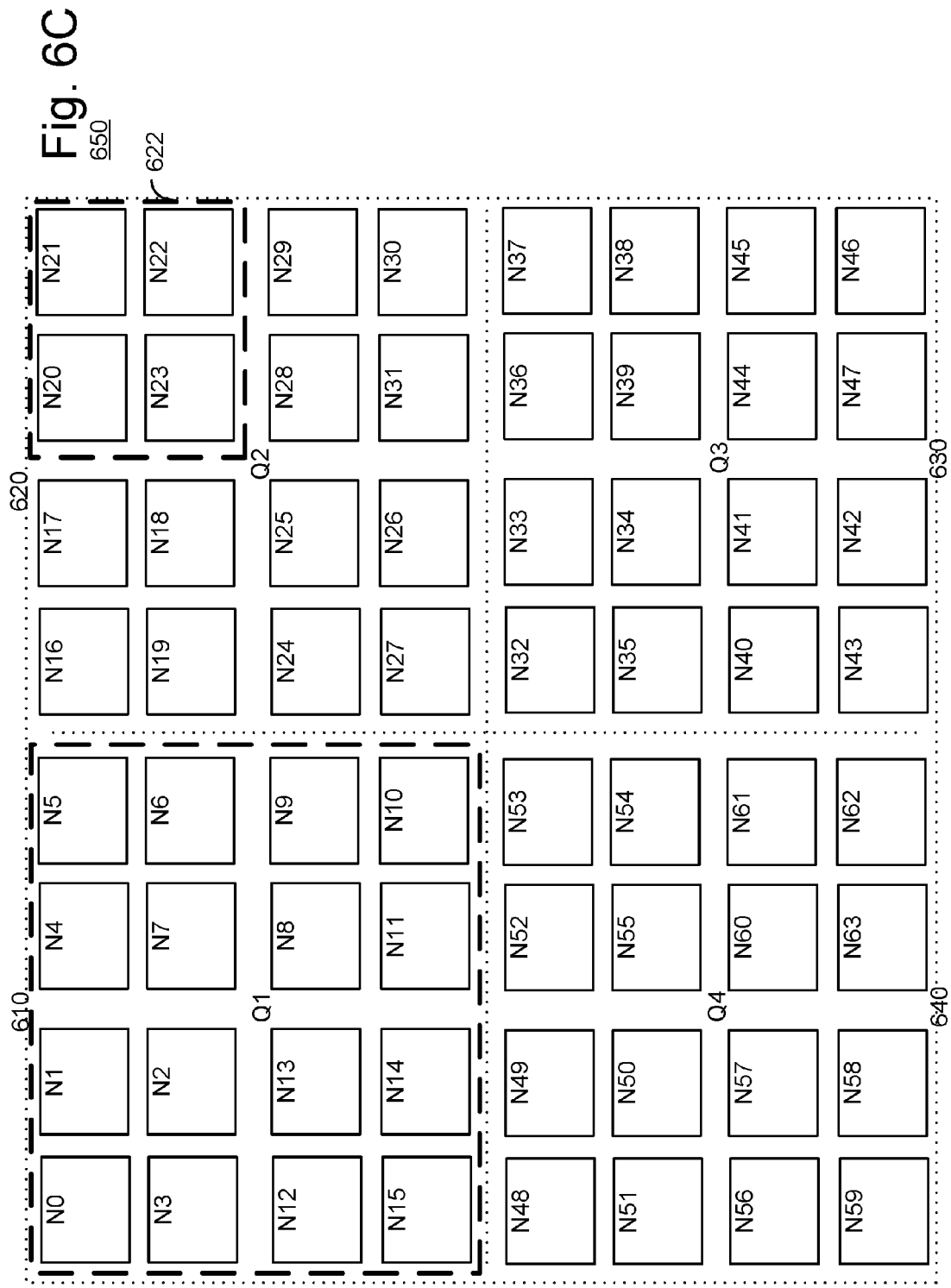

Fig. 7A

1D example

| nodes | ports |
|---|---|
| x.x.x.x.0:1 | x.x.x.x.2:0 |
| x.x.x.x.0:2 | x.x.x.x.1:1 |
| x.x.x.x.0:3 | x.x.x.x.0:2 |

2D example

| nodes | ports |
|---|---|
| x.x.x.0:4.x | x.x.x.5:3.x |
| x.x.x.0:8.x | x.x.x.4:4.x |
| x.x.x.0:12.x | x.x.x.3:5.x |

3D example

| nodes | ports |
|---|---|
| x.x.0:16.x.x | x.x.6:8.x.x |
| x.x.0:32.x.x | x.x.7:7.x.x |
| x.x.0:48.x.x | x.x.8:6.x.x |

4D example

| nodes | ports |
|---|---|
| x.0:64.x.x.x | x.9:b.x.x.x |
| x.0:128.x.x.x | x.a:a.x.x.x |
| x.0:192.x.x.x | x.b:9.x.x.x |

Fig. 7C

4D example

| nodes | ports |
|---|---|
| x.0:64.x.x.x | x.9:b.x.x.x |
| x.0:128.x.x.x | x.a:a.x.x.x |
| x.0:192.x.x.x | x.b:9.x.x.x |
| x.64:0.x.x.x | x.b:9.x.x.x |
| x.64:128.x.x.x | x.9:b.x.x.x |
| x.64:192.x.x.x | x.a:a.x.x.x |
| x.128:0.x.x.x | x.a:a.x.x.x |
| x.128:64.x.x.x | x.b:9.x.x.x |
| x.128:192.x.x.x | x.9:b.x.x.x |
| x.192:0.x.x.x | x.9:b.x.x.x |
| x.192:64.x.x.x | x.a:a.x.x.x |
| x.192:128.x.x.x | x.b:9.x.x.x |

Fig. 7B

```
5D example
nodes            ports
0:256.x.x.x      c:e.x.x.x.x
0:512.x.x.x      d:d.x.x.x.x
0:768.x.x.x      e:c.x.x.x.x 256:0.x.x.x      e:c.x.x.x.x
256:512.x.x.x    c:e.x.x.x.x
256:768.x.x.x    d:d.x.x.x.x 512:0.x.x.x      d:d.x.x.x.x
512:256.x.x.x    e:c.x.x.x.x
512:768.x.x.x    c:e.x.x.x.x 768:0.x.x.x      c:e.x.x.x.x
768:256.x.x.x    d:d.x.x.x.x
768:512.x.x.x    e:c.x.x.x.x
```

Fig. 8B

| Dim. | #nodes | #quad full mesh networks | #links or ports/node | Max. # hops |
|---|---|---|---|---|
| 1 | 4 | 1 | 3 | 1 |
| 2 | 16 | 4 | 6 | 2 |
| 3 | 64 | 16 | 9 | 3 |
| 4 | 256 | 64 | 12 | 4 |
| 5 | 1024 | 256 | 15 | 5 |
| N | 4^N | 4^(N-1) | 3*N | N |

| #nodes | #links or ports/node | Max. # hops |
|---|---|---|
| 16 | 3 | 6 |

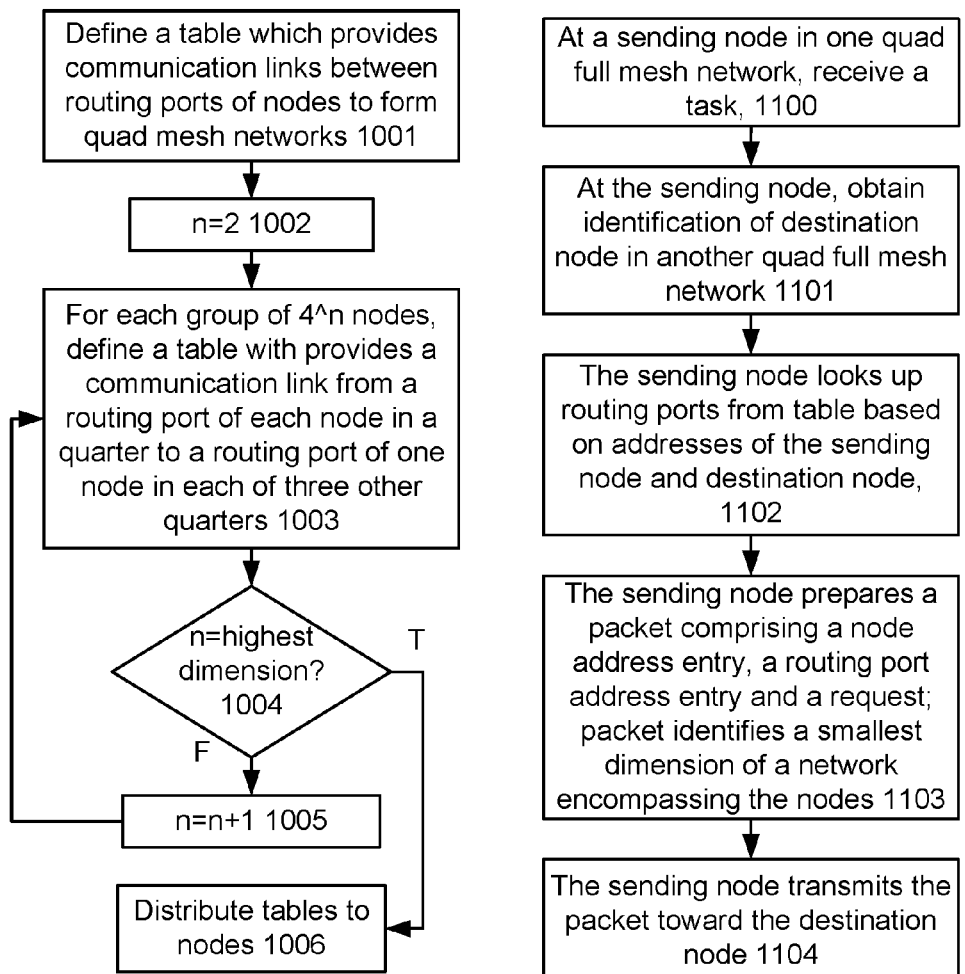
Fig. 10
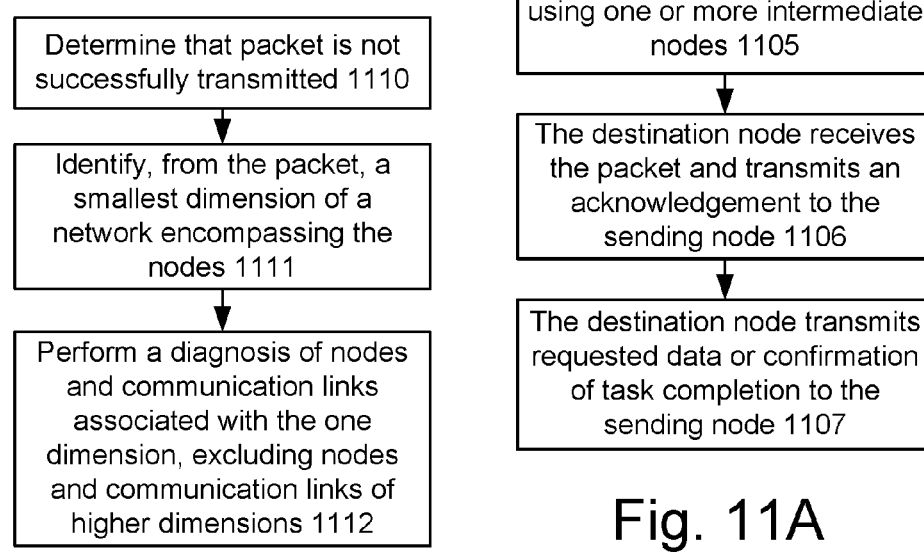
Fig. 11A
Fig. 11B

US 10,057,334 B2

QUAD FULL MESH AND DIMENSION DRIVEN NETWORK ARCHITECTURE

BACKGROUND

Data centers support business, government and consumer users, among others, by storing and providing access to data. Typically, hundreds or thousands of servers are connected to one another to efficiently store and retrieve data. The servers are connected to a network such as the internet to provide data to user devices such as cell phones, laptops and personal computers or to other client devices. In some cases, a user request is received by one server and the request is broken up into multiple tasks that are distributed to, and processed by, other servers. Data may also be communicated between servers to store backup copies or to otherwise make the data available at multiple servers. The servers communicate with one another via communication links which are arranged according to a network architecture.

BRIEF SUMMARY

A data center is provided, including a plurality of nodes comprising $4^N$ nodes, wherein N is an integer number of at least 2, and a plurality of communication links comprising $3*N*(4^N)$ communication links which connect the plurality of nodes. The nodes are arranged in $4^{(N-1)}$ quad full mesh networks. Each quad full mesh network comprises four nodes. Within each quad full mesh network, communication links connect each node to each other node. The quad full mesh networks and the plurality of communication links are arranged in N dimensions. In each dimension, each node of a quad full mesh network is connected to three other nodes of other quad full mesh networks via respective communication links.

In embodiments of the data center, for each quad full mesh network, communication links connect each node to $3*(N-1)$ nodes in other quad full mesh networks. In embodiments of the data center, a different set of communication links is associated with each dimension, and progressively larger numbers of communication links connect are used for progressively larger values of the dimension. In embodiments of the data center, a data rate of communication links in one of the dimensions is different than a data rate of communication links in another of the dimensions. In embodiments of the data center, the quad full mesh networks are arranged in four quarters, and each node in one quarter is connected to one node in each of three other quarters of the four quarters. In embodiments of the data center, in a smallest dimension which encompasses a sending node and a destination node, one quad full mesh network is in one quarter and another quad full mesh network is in another quarter and a packet is transmitted from the one quarter to the another quarter using one communication link. In embodiments of the data center, in the smallest dimension which encompasses the sending node and the destination node, the packet is transmitted within the another quarter using no more than N−1 communication links.

In embodiments of the data center, in one of the N dimensions, the quad full mesh networks are arranged in four quarters in which a service level of nodes in one of the quarters is different than a service level of nodes in another of the quarters. In embodiments of the data center, the different service levels comprise different data access speeds of storage media. In embodiments of the data center, in one of the N dimensions, the quad full mesh networks are arranged in four quarters in which a data rate of communication links for one of the quarters is different than a data rate of communication links for another of the quarters. In embodiments of the data center, the different data rates are provided by different communication link media. In embodiments of the data center, each node is connected to each other node via no more than N communication links. In embodiments of the data center, each node comprises processing and memory resources. In embodiments of the data center, each node comprises $3*N$ ports, and each port is connected to a respective one of the communication links.

A method for routing data includes, a sending node in a data center, with the sending node configured with a sending node address, identifying a destination node address of a destination node to assist with a request, the sending node identifying a sending node routing port and a destination node routing port based on the sending node address and the destination node address, the sending node providing a node address entry and a routing port address entry in a packet, with the node address entry comprising the sending node address and the destination node address, and with the routing port address entry comprising the sending node routing port and the destination node routing port, and the sending node transmitting the packet from the sending node in one quad full mesh network among a plurality of quad full mesh networks in the data center toward the destination node in another quad full mesh network in the data enter using the node address entry and the routing port address entry, the packet identifying a smallest dimension of nodes which encompasses the sending node and the destination node among N dimensions of nodes in the data center, and N is an integer number of at least 2.

In the method, the plurality of quad full mesh networks and a plurality of communication links which connect the nodes are arranged in N dimensions. The method further includes, at the sending node, transmitting the packet via no more than N communication links between the sending node and the destination node. In embodiments of the method, in each dimension, a plurality of quad full mesh networks are arranged in four quarters and each node in one quarter is connected to one node in each of three other quarters of the four quarters, and in the smallest dimension which encompasses the sending node and the destination node, the one quad full mesh network is in one quarter and the another quad full mesh network is in another quarter and the packet is transmitted from the one quarter to the another quarter using one communication link.

In embodiments of the method, in the smallest dimension which encompasses the sending node and the destination node, the packet is transmitted within the another quarter using no more than N−1 communication links. In embodiments of the method, the node address entry comprises a set of data fields, the set of data fields comprises a pair of data fields and one or more null data fields, the pair of data fields comprises the sending node address and the destination node address, and the smallest dimension which encompasses the sending node and the destination node is identified by a position of the pair of data fields within the set of data fields. In embodiments of the method, the routing port address entry comprises a set of data fields, the set of data fields comprises a pair of data fields and one or more null data fields, the pair of data fields comprises the sending node routing port and the destination node routing port, and the smallest dimension which encompasses the sending node and the destination node is identified by a position of the pair of data fields within the set of data fields. In embodiments of the method, the method further includes the sending node determining whether the packet is successfully transmitted to the destination node, and the sending node performing a diagnosis using nodes and associated communication links of the smallest dimension which encompasses the sending node and the destination node if the packet is not successfully transmitted to the destination node.

In embodiments of the method, the diagnosis excludes nodes and associated communication links of dimensions higher than the smallest dimension which encompasses the sending node and the destination node.

A data center includes a plurality of nodes comprising $4^N$ nodes, wherein N is an integer number of at least 2, and a plurality of communication links comprising $3*N*(4^N)$ communication links which connect the plurality of nodes. The nodes are arranged in $4^{(N-1)}$ quad full mesh networks. Each quad full mesh network comprises four nodes. The quad full mesh networks and the plurality of communication links are arranged in N dimensions. In each dimension, the quad full mesh networks are arranged in four quarters and each node in one quarter is connected to one node in each of three other quarters of the four quarters.

In embodiments of the data center, a data rate of communication links in one of the dimensions is different than a data rate of communication links in another of the dimensions. In embodiments of the data center, in one of the N dimensions, the quad full mesh networks are arranged in four quarters in which a service level of nodes in one of the quarters is different than a service level of nodes in another of the quarters.

A sending node in a data center comprises: a memory storing software instructions and configured with a sending node address, routing ports, and a processor configured to execute the instructions to: identify a destination node address of a destination node to assist with a request, identify a sending node routing port and a destination node routing port based on the sending node address and the destination node address, provide a packet comprising a node address entry and a routing port address entry, with the node address entry comprising the sending node address and the destination node address, and with the routing port address entry comprising the sending node routing port and the destination node routing port, and transmit the packet from the sending node in one quad full mesh network among a plurality of quad full mesh networks in the data center toward the destination node in another quad full mesh network in the data enter using the node address entry and the routing port address entry, the packet identifying a smallest dimension of nodes which encompasses the sending node and the destination node among N dimensions of nodes in the data center, and N is an integer number of at least 2.

BRIEF DESCRIPTION OF THE DRAWINGS

Aspects of the present disclosure are illustrated by way of example and are not limited by the accompanying figures for which like references indicate elements.

FIG. 1C depicts an example configuration of routing ports in the example nodes N0-N3 in the data center of FIG. 1A.

FIG. 2A depicts an example quad full mesh network which comprises four nodes and six associated communication links in a one-dimensional configuration.

FIG. 2B depicts example node and routing port entries consistent with the network of FIG. 2A.

FIG. 2C depicts an example packet comprising a node address entry and routing port address entry consistent with FIG. 2B.

FIG. 4A depicts an example network consistent with the network 300 of FIG. 3, where communication links of a second dimension are depicted.

FIG. 4B depicts example node and routing port entries consistent with the network of FIG. 4A, where the sending node is N0, N1, N2 or N3.

FIG. 4C depicts example node and routing port entries consistent with the network of FIG. 4A, where the sending node is N4, N5, N6 or N7.

FIG. 4D depicts example node and routing port entries consistent with the network of FIG. 4A, where the sending node is N8, N9, N10 or N11.

FIG. 6A depicts an example network in a three-dimensional configuration which includes sixteen quad full mesh networks, where communication links for N0, N16, N32 and N48 are depicted.

FIG. 6B depicts example node and routing port entries consistent with N0, N16, N32 and N48 of the network of FIG. 6A.

FIG. 6C depicts an example network consistent with the network of FIG. 6A, where different subsets of nodes in the network are identified in a diagnosis process.

FIG. 7A depicts an example network in a four-dimensional configuration which includes sixty-four quad full mesh networks, where communication links for N0, N64, N128 and N192 are depicted.

FIG. 7B depicts example node and routing port entries consistent with N0, N64, N128 and N192 of the network of FIG. 7A.

FIG. 7C depicts example node and routing port entries for N0 as an example of the node and routing port entries 172a of FIG. 1B, and consistent with the examples of FIGS. 2B, 4B, 6B and 7B.

FIG. 8B depicts example node and routing port entries consistent with N0, N256, N512 and N768 of the network of FIG. 7A.

FIG. 10 depicts an example process for providing an N dimensional network.

FIG. 11A depicts an example process for transmitting a packet in an N dimensional network.

FIG. 11B depicts an example process for diagnosing a problem in an N dimensional network.

DETAILED DESCRIPTION

The disclosure relates to a network architecture for a data center and to associated techniques for communicating data in a network.

Figures 9A, 9B, 9C:
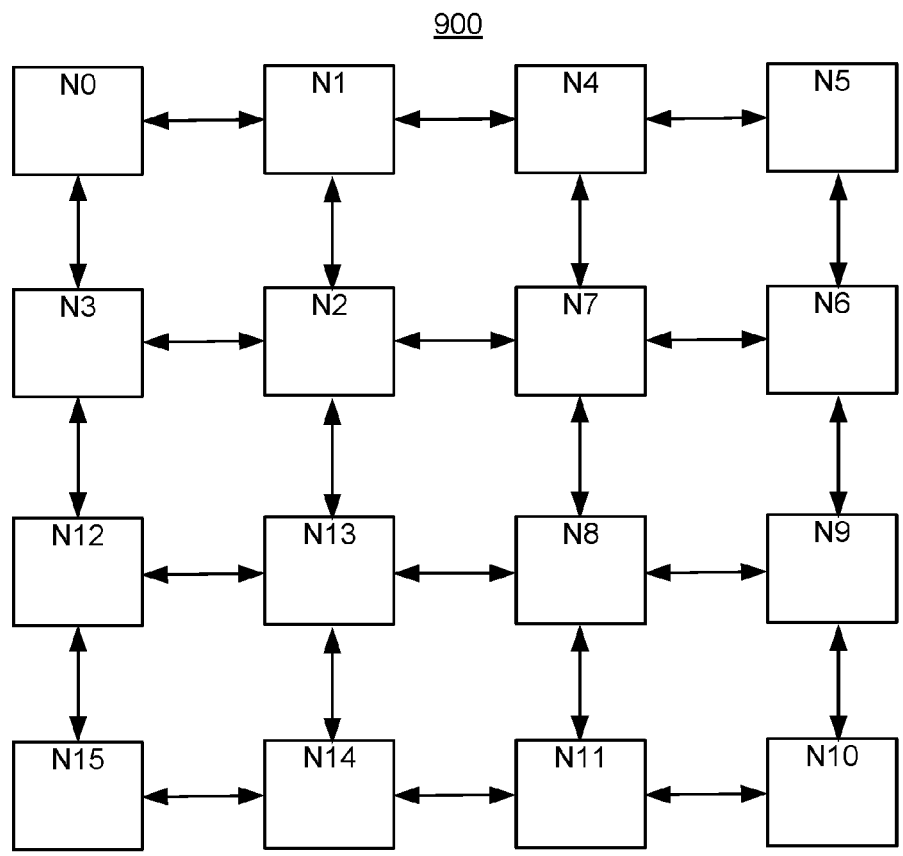
FIG. 9A depicts a table listing network dimension, number of nodes, number of quad full mesh networks, number of links or ports per node and maximum number of hops, consistent with FIG. 1A to 8B.
FIG. 9B depicts a comparative example of a mesh network.
FIG. 9C depicts a table listing number of nodes, number of links or ports per node and maximum number of hops, consistent with FIG. 9B.

In a data center, nodes/servers are connected to one another using a network architecture. To meet current and future needs, faster read and write times for the storage media of a node, and faster data rates between nodes, are desired. The data rate is affected by, e.g., the type of communication link used and the connection of the links between nodes. For example, FIG. 9B depicts a comparative example of a mesh network 900. The network has sixteen nodes, N0-N15. The arrows between the nodes represent communication links, such that each node has two, three or four communication links to send and receive data from its nearest neighbor node. A disadvantage of this approach is that, when communicating packets of data between nodes, the maximum number of hops is relatively high. For example, a packet sent from nodes N0 to N10 might travel through nodes N1, N4, N5, N6 and N9 before reaching N10, in six hops. A hop represents a communication of a packet between two nodes. In this case, the packet passes through, and is routed by, five intermediate nodes (N1, N4, N5, N6 and N9) which are between the endpoint nodes of N0 and N10. The fact that different nodes have different numbers of communication ports can also make the implementation more difficult.

Moreover, there is an overhead cost for processing the incoming packets in each node of the intermediate nodes in the path between the source and destination nodes. The costs are incurred from packet termination, packet analysis, and packet forwarding for every incoming packet. There could be a huge amount of packets in high speed links in general. Therefore, reducing the number of hops for communications between source and destination nodes provides a corresponding huge benefit in terms of energy savings and improved performance.

FIG. 9C depicts a table listing number of nodes, number of links or ports per node and maximum number of hops, consistent with FIG. 9B. In this example, there are sixteen nodes with three links or ports per node, and the maximum number of hops is six. In comparison, FIG. 9A depicts a table listing network dimension, number of nodes, number of quad full mesh networks, number of links or ports per node and maximum number of hops, for a network architecture consistent with FIG. 1A to 8B. For the analogous case of sixteen nodes, there are six links or ports per node and the maximum number of hops is two. The maximum number of hops is therefore reduced from six to two. Further, each node has an equal numbers of communication ports. This advantage becomes larger as the number of nodes increases.

The network topologies provided herein are compatible with a memory-centric approach of a data center. In a memory-centric approach, a focus is on providing a network architecture which complements a very high access speed (read/write data rate) of the memory of the data center. Various types of memory which may be used include phase change memory (PCM), 3D cross point, dynamic random access memory (DRAM), static RAM (SRAM), NOR memory, flash memory, resistive random access memory (RRAM), or hard disk drives. Volatile or non-volatile memory can be used. For example, RAM has a very fast access time of about one nanosecond, DRAM has an access time of about 30 nanoseconds, flash memory has an access time of about 25 microseconds and a hard drive has an access time in the millisecond range.

One approach is to expand the use of cache memory in a node. Cache memory can be accessed more quickly by a computer microprocessor than other types of memory. It can be integrated directly with the CPU chip or placed on a separate chip that has a separate bus interconnect with the CPU. The use of higher speed memory can meet the demands of future networks such as 5G mobile data networks. 5G hardware/software (HW/SW) platforms can meet the requirements imposed by the anticipated exponential growth in mobile data traffic (e.g., a 1000 fold increase relative to the current 4G technology) together with a larger diversity of applications.

The communication links between the nodes can include optical, electrical and/or wireless links. For example, the optical links can use silicon photonics, where a semiconductor laser is combined with an integrated circuit as an alternative to an optical transponder on a printed circuit board. With silicon photonics, the optical transponder is inside the chip and an IC pin is the optical link connection. An optical fiber link can use dense wavelength division multiplexing (DWDM) to carry multiple channels of data at once. Current designs can provide data speeds of 100 gigabits/sec. using existing protocols such as Ethernet. Using these and other technologies, latency in the data center can be reduced. Another challenge is providing a network architecture which can be efficiently scaled up and provide assistance in fault isolation when a problem occurs. The techniques provided herein address the above and other issues.

The techniques provide a clustering mechanism and a lightweight topological protocol. In one aspect, a quad node full mesh and dimension driven hyper-torus clustering architecture with a lightweight topology protocol is provided. Three links per node create a full mesh connection covering each dimension/layer of multiple dimensions/layers of a network. The quad node unit is a basic building block to grow higher dimensions/layers and three links are used to provide a full mesh connection. The number N of nodes grows based on 4×N (where N is a group which has a dimension characteristic). The maximum number of hops, i.e., the worst case for data travel between nodes in the cluster, is determined as the dimension N. The links in a network can be considered to be arranged in distinct sets or dimensions. That is, a given link may be assigned to one dimension. The dimension a link is assigned to can represent a length of the link, where a lower dimension corresponds to relatively shorter links which connects nodes which are relatively closer together. A higher dimension corresponds to relatively longer links which connects nodes which are relatively further apart. By arranging the links in dimensions as described herein, the number of hops between nodes can be optimized.

This is distinguished from other clustering architectures such as a mesh or tree architecture with no dimension based approach. In the best case, only one hop is used to reach a destination node.

A further advantage is that task assignments per dimension (or group) are available. It is easy to categorize geographical segments in different data types (hot/warm/cold), there are no limits on the scale out size of a cluster, and a large overhead cost savings can be achieved by reducing the number of hops during data transfer in the cluster.

Figure 1A:
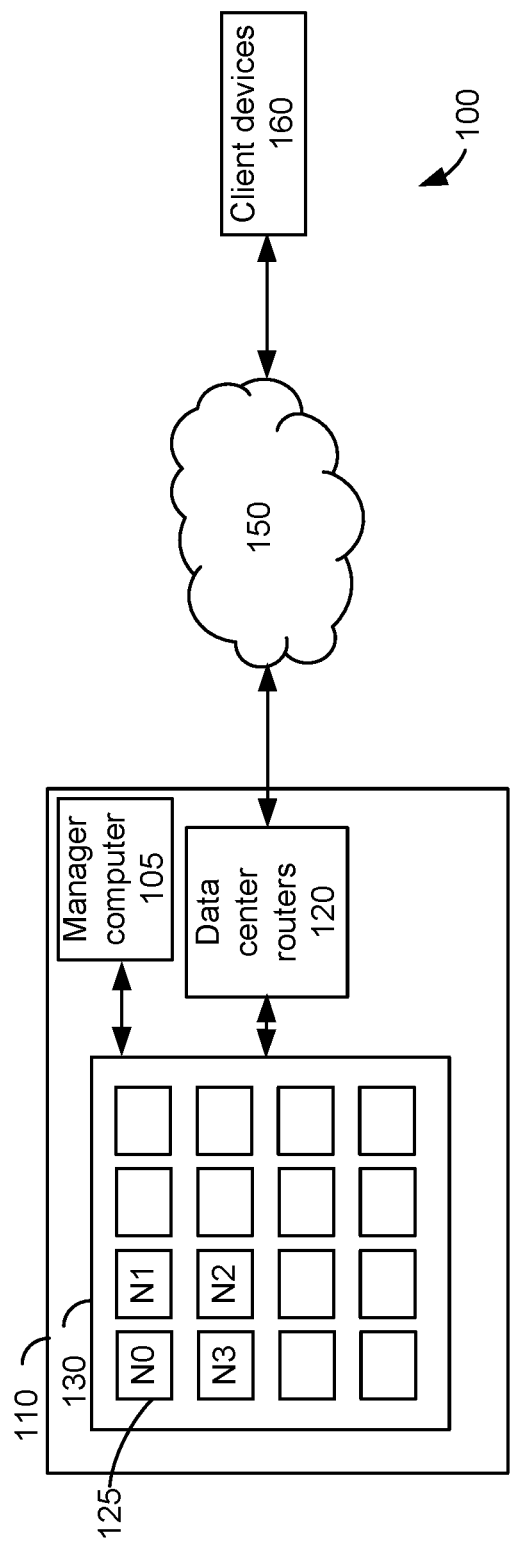
FIG. 1A depicts an example network including a data center.

FIG. 1A depicts an example network 100 including a data center 110, a network 150 such as the internet and client computing devices 160 such as cell phones, laptops or personal computers. Another example of a client computing device is an analytic server which accesses the data center, such as to perform a big data analysis. The data center includes a number of nodes, such as example node 125, which are connected by a bus or backplane 130, for instance, to data center routers 120. Each node comprises processing and memory resources. Example nodes are labeled N0, N1, N2 and N3. The bus or backplane, such as an optical backplane, is connected to each node to allow each node to communicate directly with the data center routers. The routers may be arranged hierarchically to transfer data between the network 150 and the nodes. Communication links can also be provided between the nodes, as shown in subsequent figures. A manager computer may be used to configure each node with a respective set of node and routing port entries, as discussed further below.

An example implementation includes 2176 servers arranges in 34 pods on 17 racks, where one pod comprises 64 servers in an eight rows and eight columns.

Some data centers extend over a large area of many acres. However, future data centers are expected to be much smaller. A data center could include nodes which are co-located, e.g., in one building, or geographically dispersed, e.g., in different cities.

Figure 1B:
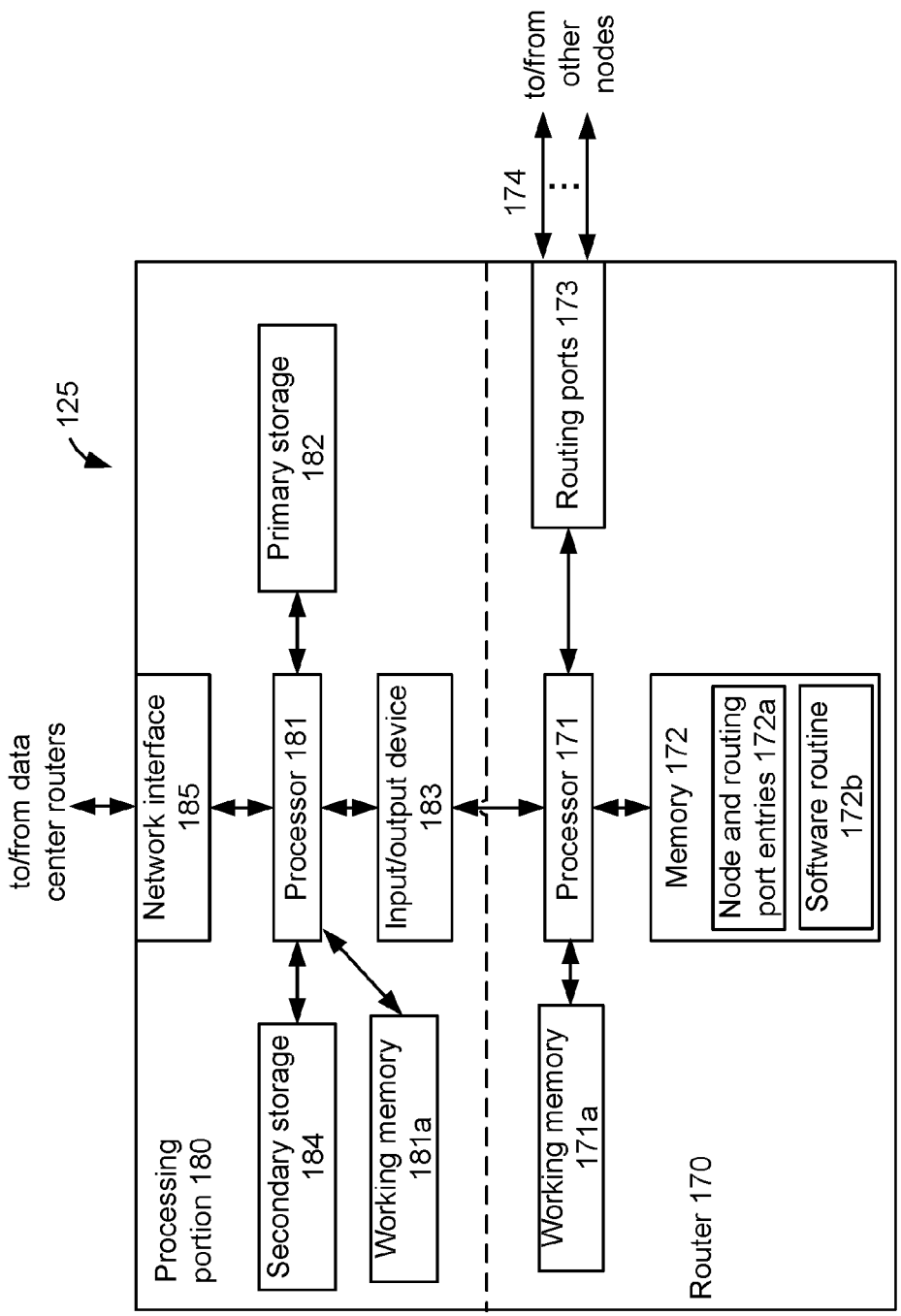
FIG. 1B depicts an example configuration of a node in the data center of FIG. 1A.

FIG. 1B depicts an example configuration of a node 125 in the data center 110 of FIG. 1A. Each node includes processing, data storage and routing/switching capabilities. For example, a router 170 may be provided which includes a processor 171, a memory 172 and routing ports 173 associated with communication links 174 to/from other nodes. The routing ports may be considered to be input/output ports because they can receive and transmit data. The memory 172 may store node address and routing ports entries 172a which identify a communication path to a destination node. The memory may also store an address of the node 125 such as an Internet Protocol (IP) address and/or Media Access Control (MAC) address. Self-adaptive or autonomous routing may be used, for example. Based on the node address and routing ports entries 172a, the routing ports may be associated with different network dimensions. For example, FIG. 7C provides an example of node and routing port entries for a node N0. The processor 171 can access the node and routing port entries to determine which routing port to use when routing a packet to another node. A processing and data storage portion 180 of the data center includes a processor 181, a primary storage 182, an input/output device 183, a secondary storage 184, and a network interface 185. The primary storage 182 may include a storage media with a relatively high access speed such as cache memory. One example implementation uses RAM. The secondary storage 184 may include a storage media with a relatively low access speed such as solid state memory, e.g., flash memory, or a hard disk drive. Data which is accessed relatively frequently can be stored in the primary storage 182 to reduce latency. The processor 181 may include a microprocessor or other implementation of a central processing unit. The input/output device 183 comprises an interface that allows the processor 181 to communicate with the processor 171 of the router 170, such as to send packets to, and receive packets from, other nodes.

The network interface 185 allows the node 125 to communicate with a data center router or routers. The network interface 185 may connect to the bus or backplane 130, for instance.

The node 125 can include a server, for example. Servers which are commonly used typically have a large computing power and are connected to some type of storage device such as hard disk drives. In future designs, the node CPU capability will be more dedicated to input and output so that the server is more like a memory controller. A node 125 may include some type of CPU acceleration capability. An accelerator can be attached to a CPU bus to quickly execute key functions.

The processor 181 may load and execute code (e.g., a software routine 172b) in a working memory 181a to carry out the functions described herein. The processor 171 may load and execute code in a working memory 171a to carry out the functions described herein. Various computing devices may utilize all of the components shown, or only a subset of the components, and levels of integration may vary from device to device. Furthermore, a device may contain multiple instances of a component, such as multiple processing units, processors, memories, transmitters, receivers, etc. The data source may comprise a hardware storage device which stores samples of data which are to be processed. The processor may be any type of electronic data processor such as a CPU. The input/output devices may include network interfaces, storage interfaces, monitors, keyboards, pointing devices and the like. A working memory may store code, e.g., instructions which are executed by a processor to carry out the functions described herein. The code may be stored in a non-volatile memory and loaded into the working memory.

The memory/storage devices may comprise any type of system memory such as static random access memory (SRAM), dynamic random access memory (DRAM), synchronous DRAM (SDRAM), read-only memory (ROM), a solid state drive, hard disk drive, a magnetic disk drive, or an optical disk drive. The memory devices may include ROM for use at boot-up, and DRAM for program and data storage for use while executing programs. The memory devices may include non-transitory, hardware memory devices.

The manager computer 105 may have a similar configuration as the processing portion 180. Its memory stores node and routing port entries for all of the nodes and communicates the relevant node and routing port entries to each node to configure the network.

FIG. 1C depicts an example configuration of routing ports in the example nodes N0-N3 in the data center of FIG. 1A. In one approach, each routing port can send or receive data at a given time via a bidirectional communication link. Further, a communication link can extend from one port of one node to another port of another node. The communication links can also be associated with different network dimensions. In this example, each node has fifteen ports labeled p0, p1, p2, p3, p4, p5, p6, p7, p8, p9, pa, pb, pc, pd and pe. Ports p0, p1 and p2 (a first set of ports 140) are associated with a first dimension (D1), ports p3, p4 and p5 (a second set of ports 141) are associated with a second dimension (D2), ports p6, p7 and p8 (a third set of ports 142) are associated with a third dimension (3D), ports p9, pa and pb (a fourth set of ports 143) are associated with a fourth dimension (4D), and ports pc, pd and pe (a fifth set of ports 144) are associated with a fifth dimension (5D).

N1 similarly includes a first set of ports 190 in D1, a second set of ports 191 in D2, a third set of ports 192 in D3, a fourth set of ports 193 in D4 and a fifth set of ports 194 in D5. N2 similarly includes a first set of ports 195 in D1, a second set of ports 196 in D2, a third set of ports 197 in D3, a fourth set of ports 198 in D4 and a fifth set of ports 199 in D5. N3 similarly includes a first set of ports 145 in D1, a second set of ports 146 in D2, a third set of ports 147 in D3, a fourth set of ports 148 in D4 and a fifth set of ports 149 in D5.

In one approach, the routing ports of different nodes are connected in patterns, where each pattern is different and is associated with a dimension of the network. For example, the routing ports of different nodes in D1 may be connected to one another by associated communication links, the routing ports of different nodes in D2 may be connected to one another by associated communication links, the routing ports of different nodes in D3 may be connected to one another by associated communication links, the routing ports of different nodes in D4 may be connected to one another by associated communication links, and the routing ports of different nodes in D5 may be connected to one another by associated communication links. Specific examples are provided below.

Note that a network may be expanded over time to a higher dimension as additional nodes and communication links are added. Some of the routing ports may not be used if they are associated with a higher dimension than the current dimension of the network. For example, if the current dimension is N=3 (D3), then, for N0, the sets of routing ports 140, 141 and 142 will be used but not the sets of routing ports 143 and 144.

FIG. 2A depicts an example quad full mesh network 200 which comprises four nodes and six associated communication links in a one-dimensional (1D) configuration. Each node is directly connected by one communication link to each other node. For example, a link L0-1 connects a port p2 of N0 to a port p0 of N1, a link L0-3 connects a port p0 of N0 to a port p2 of N3, a link L0-2 connects a port p1 of N0 to a port p1 of N2, a link L1-2 connects a port p2 of N1 to a port p0 of N2, a link L2-3 connects a port p2 of N2 to a port p0 of N3, and a link L1-3 connects a port p1 of N1 to a port p1 of N3.

A quad full mesh network is suitable unit which can be repeated to expand the dimension of a network. Referring also to FIG. 9A, the dimension of the network is based on the number of quad full mesh networks and the number of nodes. For example, let N (an integer of one or more) represent the dimension. In the lowest dimension (the first dimension or N=1), there is one quad full mesh networks and four nodes. In the second lowest dimension (the second dimension or N=2), there are four quad full mesh networks and sixteen nodes. In the next dimension (the third dimension or N=3), there are sixteen quad full mesh networks and sixty-four nodes, and so forth. Generally, with a dimension=N, the number of nodes is 4^N (four to the power of N) and the number of quad full mesh networks is 4^(N−1) four to the power of N−1). Arranging the number of nodes in a dimension based on the power of four allows for a convenient organization of the nodes and links.

FIG. 2B depicts example node and routing port entries consistent with the network of FIG. 2A. A table includes node address entries and corresponding routing port entries. For a given sending node and destination node, there will be a prescribed routing port to use in the sending node and in the destination node. In one approach, a node address entry has the syntax of "sending node address:destination node address" and routing port address entry has the syntax of "sending routing port:destination routing port." Further, a number of null or other default data values can be provided before and/or after the node and port addresses to indicate an associated dimension. For example, the node address entry 220*a* is x.x.x.x.0:1, indicating N0 is the sending node and N1 is the destination node. Further, there are no null fields (x) after the node address and routing port address, indicating that the dimension is the lowest dimension, or D1. The corresponding routing port address entry 220*b* is x.x.x.x.2:0, indicating p2 is the routing port in the sending node and p0 is the routing port in the destination node. Again, there are no null fields (x) after the node address and routing port address, indicating that the dimension is the lowest dimension, or D1. The corresponding link is L0-1.

The table provides similar information for the remaining cases. The table can be considered to be routing information which is used by the sending node, to send a packet to a destination node.

FIG. 2C depicts an example packet 230 comprising a node address entry 231*a* and routing port address entry 231*b* in a header 231 of the packet, consistent with FIG. 2B. The header 231*c* may include other information, such as error correction code (ECC) data 231*c*, which is used by the destination node to determine if a packet is successfully received. The ECC data 231*c* may comprise a checksum, for instance. A packet identifier (ID) 231*d* may be used to identify a sequential position of the packet in a group of packets, for use by the destination node.

The destination node may determine that there is an error in a packet transmission for various reasons. One example is when the checksum or other ECC data 231*c* does not have the expected value. Another example is when a packet is missing in a sequence of packets. The sending node may also determine that there is an error in a packet transmission, for example, if an acknowledgement or requested data is not received from the destination node within a specified amount of time after the sending node transmits the packet.

Payload data 232 is also provided in the packet. For example, the payload data 232 may include data regarding a user request which was broken up into multiple tasks, so that instructions for a task are communicated from one node to another in the payload data 232. In another example, the payload data 232 comprises a duplicate copy of data which is to be stored at the destination node to improve the availability of the data. Many other examples are possible.

Figure 3:
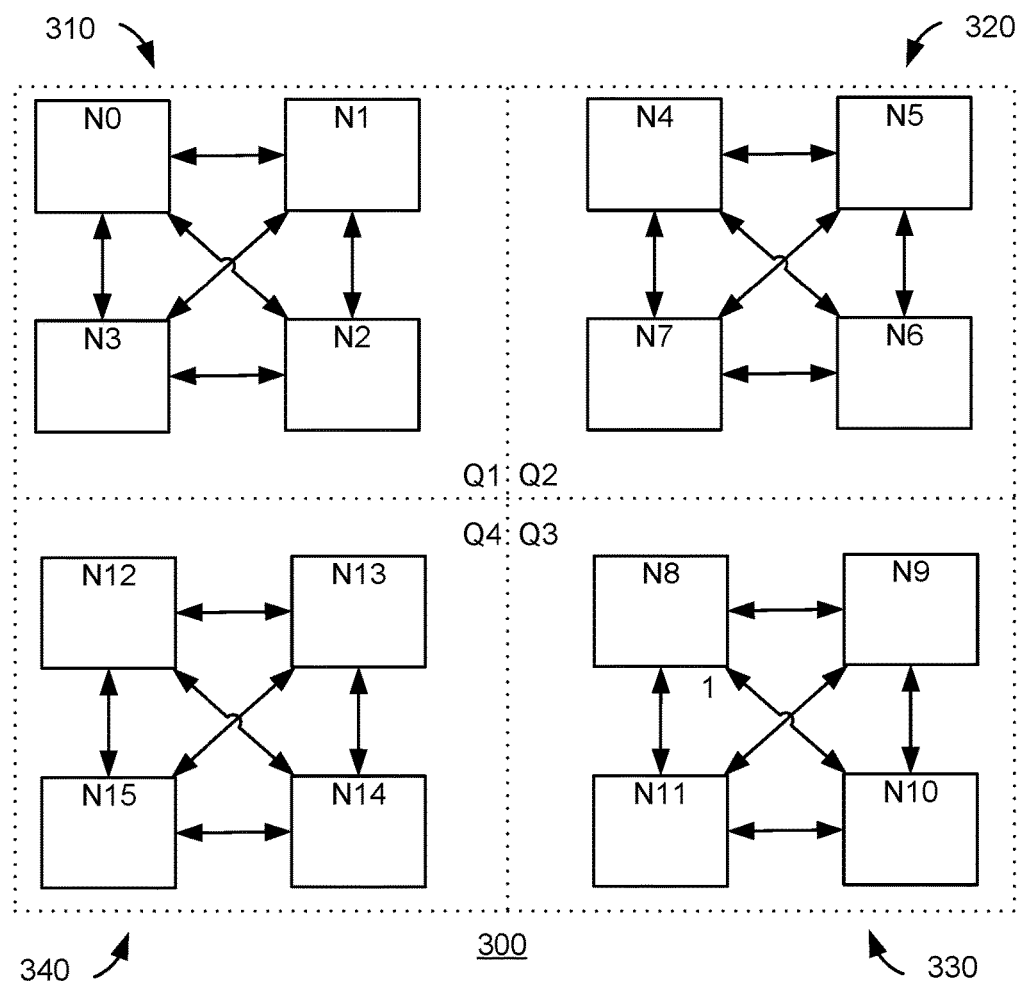
FIG. 3 depicts an example network in a two-dimensional configuration which includes four quad full mesh networks, where communication links of a first dimension are depicted.

FIG. 3 depicts an example network 300 in a two-dimensional configuration which includes four quad full mesh networks 310, 320, 330 and 340, where communication links of a first dimension are depicted. The quad full mesh networks 310, 320, 330 and 340 include nodes N0-N3, N4-N7, N8-N11 and N12-N15, respectively. Further, the nodes and quad full mesh networks 310, 320, 330 and 340 are arranged in quarters, including Q1, Q2, Q3 and Q4, respectively. As seen below, in each dimension of the network, each node in a quarter of the network is connected to three others nodes, one node in each other quarter.

FIG. 4A depicts an example network 400 consistent with the network 300 of FIG. 3, where communication links of a second dimension are depicted. The network includes quad full mesh networks 410, 420, 430 and 440 in quarters Q1, Q2, Q3 and Q4, respectively. This example shows the communication links of the second dimension only. The communication links of the first dimension, e.g., the dimension of a quad full mesh network, are depicted in FIG. 2A. Each node of the network 400 is connected to three other nodes, one in each other quarter, in the second dimension.

Figures 4E, 5:
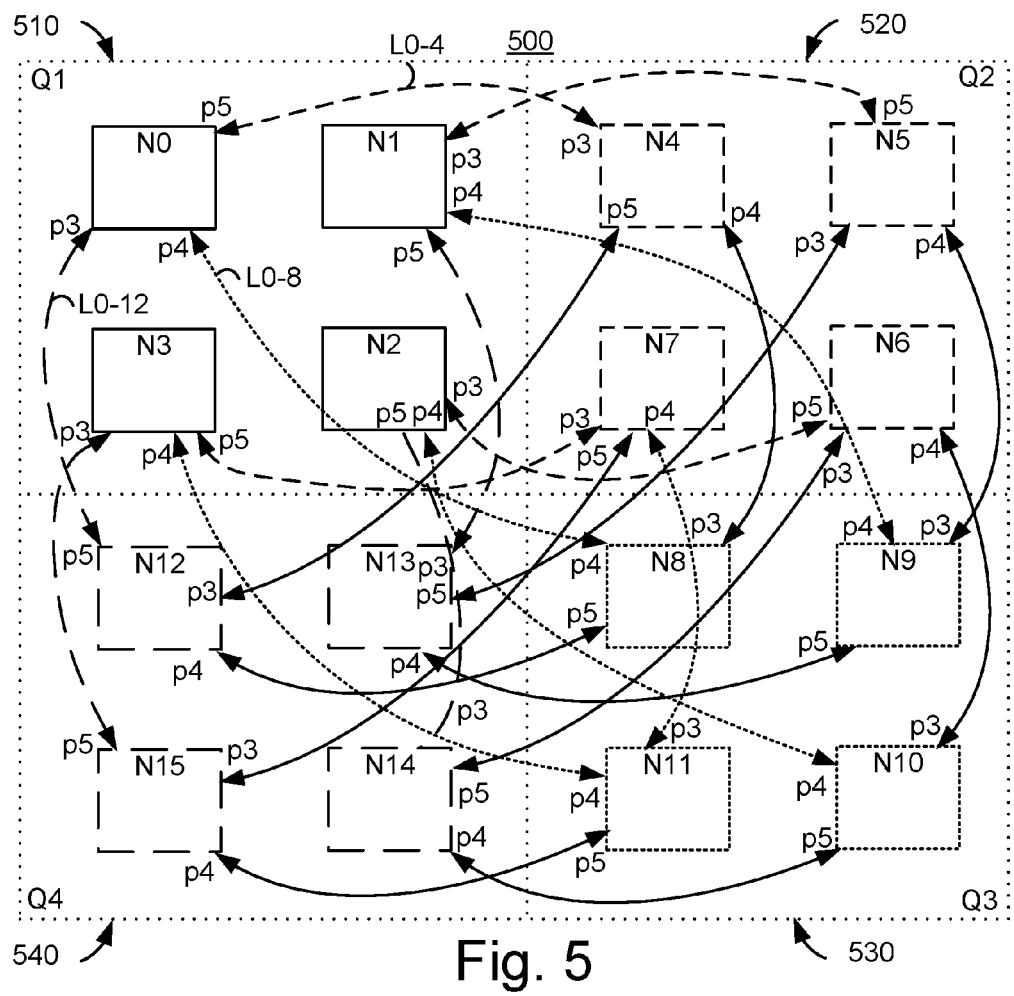
FIG. 4E depicts example node and routing port entries consistent with the network of FIG. 4A, where the sending node is N12, N13, N14 or N15.
FIG. 5 depicts an example network consistent with the networks of FIGS. 3 and 4A, where the nodes in different quarters of the network and the associated communication links provide different service levels.

In the example of FIG. 4A, N0 at p5 is connected to N4 at p3, N0 at p4 is connected to N8 at p4, and N0 at p3 is connected to N12 at p5. The connections between the nodes are depicted in the tables of FIG. 4B-4E. In a second dimension of the network 400, a node of a quarter is connected to other nodes of other quarters, or of other meshes.

FIG. 4B depicts example node and routing port entries consistent with the network of FIG. 4A, where the sending node is N0, N1, N2 or N3. The node address entry x.x.x.0: 4.x indicates N0 in Q1 is the sending node and N4 in Q2 is the destination node. The entry comprises a number of fields, where some of the fields are null data as represented by an "x." Further, one of the fields identifies the sending node and an adjacent, subsequent field identifies the destination node. The fields that identify the sending and destination nodes are separated by a colon (":"). The position of the sending and destination nodes fields within the entry may further denote a dimension of a communication which is made using the identified ports. For example, the number of null fields on the right hand side of the sending and destination nodes fields (after the sending and destination nodes fields) can be correlated to the dimension.

In the entry x.x.x.0:4.x, there is one null field (x) after the node addresses and routing port addresses. This fact can denote that these entries are used for communications in the second dimension, or D2. In this scheme, the dimension is equal to one more than the number of null fields after the node address and/or routing port address.

Alternatively, the fact that there are three fields before the node addresses and routing port addresses can also denote that these entries are used for communications in the second dimension. In this scheme, the dimension is equal to five minus the number of null fields (e.g., three) before the node addresses and/or routing port addresses. The dimension could also be indicated by a separate data field in a packet.

Generally, the node address entry comprises a set of data fields, the set of data fields comprises a pair of data fields and one or more null data fields, and the pair of data fields comprises the sending node address and the destination node address. Further, in the node address entry, the smallest dimension which encompasses the sending node and the destination node is identified by a position of the pair of data fields within the set of data fields In other words, in a node address entry, a dimension can be identified by a number of null data fields before and/or after the data fields for the sending node address and the destination node address.

Similarly, the routing port address entry comprises a set of data fields, the set of data fields comprises a pair of data fields and one or more null data fields, and the pair of data fields comprises the sending node routing port and the destination node routing port. Further, in the routing port address entry, the smallest dimension which encompasses the sending node and the destination node is identified by a position of the pair of data fields within the set of data fields.

In other words, in a routing port address entry, a dimension can be identified by a number of null data fields before and/or after the data fields for the sending node routing port address and the destination node routing port address. For example, the routing port address entry x.x.x.5:3.x indicates p5 is the routing port in the sending node and p3 is the routing port in the destination node. There is one null field (x) after, and three data fields before, the node address and routing port address, indicating that the dimension is N=2.

The node address entry x.x.0:8.x indicates N0 is the sending node in Q1 and N8 in Q3 is the destination node. The routing port address entry x.x.x.4:4.x indicates p4 is the routing port in the sending node and p4 is the routing port in the destination node.

The node address entry x.x.0:12.x indicates N0 is the sending node in Q1 and N12 in Q4 is the destination node. The routing port address entry x.x.x.3:5.x indicates p3 is the routing port in the sending node and p5 is the routing port in the destination node.

The remaining entries apply when the sending node is N1, N2 or N3.

FIG. 4C depicts example node and routing port entries consistent with the network of FIG. 4A, where the sending node is N4, N5, N6 or N7. The node address entry x.x.x.4:0.x indicates N4 in Q2 is the sending node and N0 in Q1 is the destination node. The routing port address entry x.x.x.3:5.x indicates p3 is the routing port in the sending node and p5 is the routing port in the destination node.

The node address entry x.x.4:8.x indicates N4 in Q2 is the sending node and N8 in Q1 is the destination node. The routing port address entry x.x.x.4:3.x indicates p4 is the routing port in the sending node and p3 is the routing port in the destination node.

The node address entry x.x.4:12.x indicates N4 in Q2 is the sending node and N12 in Q4 is the destination node. The routing port address entry x.x.x.5:3.x indicates p5 is the routing port in the sending node and p3 is the routing port in the destination node.

The remaining entries apply when the sending node is N5, N6 or N7.

FIG. 4D depicts example node and routing port entries consistent with the network of FIG. 4A, where the sending node is N8, N9, N10 or N11. The node address entry x.x.8:0.x indicates N8 in Q3 is the sending node and N0 in Q1 is the destination node. The routing port address entry x.x.x.4:4.x indicates p4 is the routing port in the sending node and p4 is the routing port in the destination node. The remaining entries apply for other communications from N8 and when the sending node is N5, N6 or N7.

FIG. 4E depicts example node and routing port entries consistent with the network of FIG. 4A, where the sending node is N12, N13, N14 or N15. The node address entry x.x.12:0.x indicates N12 in Q4 is the sending node and N0 in Q1 is the destination node. The routing port address entry x.x.x.5:3.x indicates p5 is the routing port in the sending node and p3 is the routing port in the destination node. The remaining entries apply for other communications from N12 and when the sending node is N13, N14 or N15.

FIG. 5 depicts an example network 500 consistent with the networks of FIGS. 3 and 4A, where the nodes in different quarters of the network and the associated communication links provide different service levels. The network includes quad full mesh networks 510, 520, 530 and 540 in quarters Q1, Q2, Q3 and Q4, respectively.

In FIG. 5, the different dashed lines of the nodes and the communication links represent different service levels. As an example, the communication links of L0-4, L0-8 and L0-12 provide different service levels. The network architecture allows for a convenient differentiation of service levels among nodes and/or communication links. For example, in a given dimension of the network, the service levels of the nodes may differ in different quarters. For instance, the service level of nodes in Q1 can be different from the service level of nodes in Q2, while the nodes in Q1 may have an equal service level and the nodes in Q2 may have an equal service level. The service level of a node can involve different factors such as access speed of storage media at a node, e.g., in terms of bits/sec.

In another example, the nodes of Q2 and Q4 have an equal, medium service level and are used to store data (warm data) which is accessed with a medium frequency, e.g., once a month. These nodes may provide a medium access speed by using flash memory, for example. The nodes of Q1 have a high service level and are used to store data (hot data) which is accessed with a high frequency, e.g., once a day. These nodes may provide a high access speed by using cache memory, for example. The nodes of Q3 have a low service level and are used to store data (cold data) which is accessed with a low frequency, e.g., once a year. These nodes may provide a low access speed by using hard disk drives, for example.

The service levels of communication links can also vary in different quarters, e.g., in terms of data transfer speed. A service level of a node or communication link could also be associated with other factors such as reliability, e.g., mean time between failures, error rate, or availability, e.g., the probability that the node or link is operational at a given time. Different data transfer rates can be provided by different communication link media, e.g., optical versus copper wire, and/or by different allocations of bandwidth within a transmission medium. For example, in a given dimension of the network, the service level of communication links between Q1 and Q2 can be different from the service level of communication links between Q1 and Q3. Even when different communication links use the same media, different service levels can be provided by prioritizing communications over one link relative to another link. The service levels of communication links can also vary with the associated network dimension such that the links in on dimension provide a different service level than the links in another dimension.

FIG. 6A depicts an example network 600 in a three-dimensional configuration which includes sixteen quad full mesh networks, where communication links for nodes N0, N16, N32 and N48 are depicted. The network includes sixteen quad full mesh networks 610 (N0-N15), 620 (N16-N31), 630 (N32-N47) and 640 (N48-N63) in quarters Q1, Q2, Q3 and Q4, respectively. Example communication links for N0, N16, N32 and N48 are provided. Refer also to FIG. 6B, which depicts example node and routing port entries consistent with N0, N16, N32 and N48 of the network of FIG. 6A.

The node address entry x.x.0:16.x.x indicates N0 in Q1 is the sending node and N16 in Q2 is the destination node. Further, there are two null fields (x) after the node address and routing port address, indicating that the dimension is the third dimension, or D3. The routing port address entry x.x.6:8.x.x indicates p6 is the routing port in the sending node and p8 is the routing port in the destination node. The associated communication link is L0-16.

The node address entry x.x.0:32.x.x indicates N0 in Q1 is the sending node and N32 in Q3 is the destination node. The routing port address entry x.x.7:7.x.x indicates p7 is the routing port in the sending node and p7 is the routing port in the destination node. The associated communication link is L0-32.

The node address entry x.x.0:48.x.x indicates N0 in Q1 is the sending node and N48 in Q4 is the destination node. The routing port address entry x.x.8:6.x.x indicates p8 is the routing port in the sending node and p6 is the routing port in the destination node. The associated communication link is L0-48.

The remaining entries apply for communications when the sending node is N16, N32 or N48. The entries for the other nodes can follow the pattern described but are not listed for brevity.

FIG. 6C depicts an example network consistent with the network of FIG. 6A, where different subsets of nodes in the network are identified in a diagnosis process. The network includes the four quad full mesh networks 610 (N0-N15), 620 (N16-N31), 630 (N32-N47) and 640 (N48-N63) in quarters Q1, Q2, Q3 and Q4, respectively, as in FIG. 6A. In one example, the heavy dashed line around Q1 indicates this subset of the network 650 has been identified as being a possible source of an error in the network. In another example, the heavy dashed line around the quad full mesh network 622 in Q2 indicates this subset of the network 650 has been identified as being a possible source of an error in the network. See also the process of FIG. 11B.

As an example, when a packet transmission from one node to another is unsuccessful, the source of the error can be limited to the smallest dimension of the network which encompasses the sending and destination nodes and the associated communication links. For instance, the dashed line around the four quad full mesh networks 610 indicates that the sending and destination nodes and the associated communication links are within this region, with dimension N=2. The dashed line around the quad full mesh network 622 indicates that the sending and destination nodes and the associated communication links are within this region, with dimension N=1. A diagnostic process can therefore focus on the components of a particular dimension of the network, rather than on the entire network. In one approach, the sending and/or destination nodes can generate an error message which is seen by a person such as a system administrator, who can perform a diagnosis. The diagnosis can also be automated.

Figure 7A:
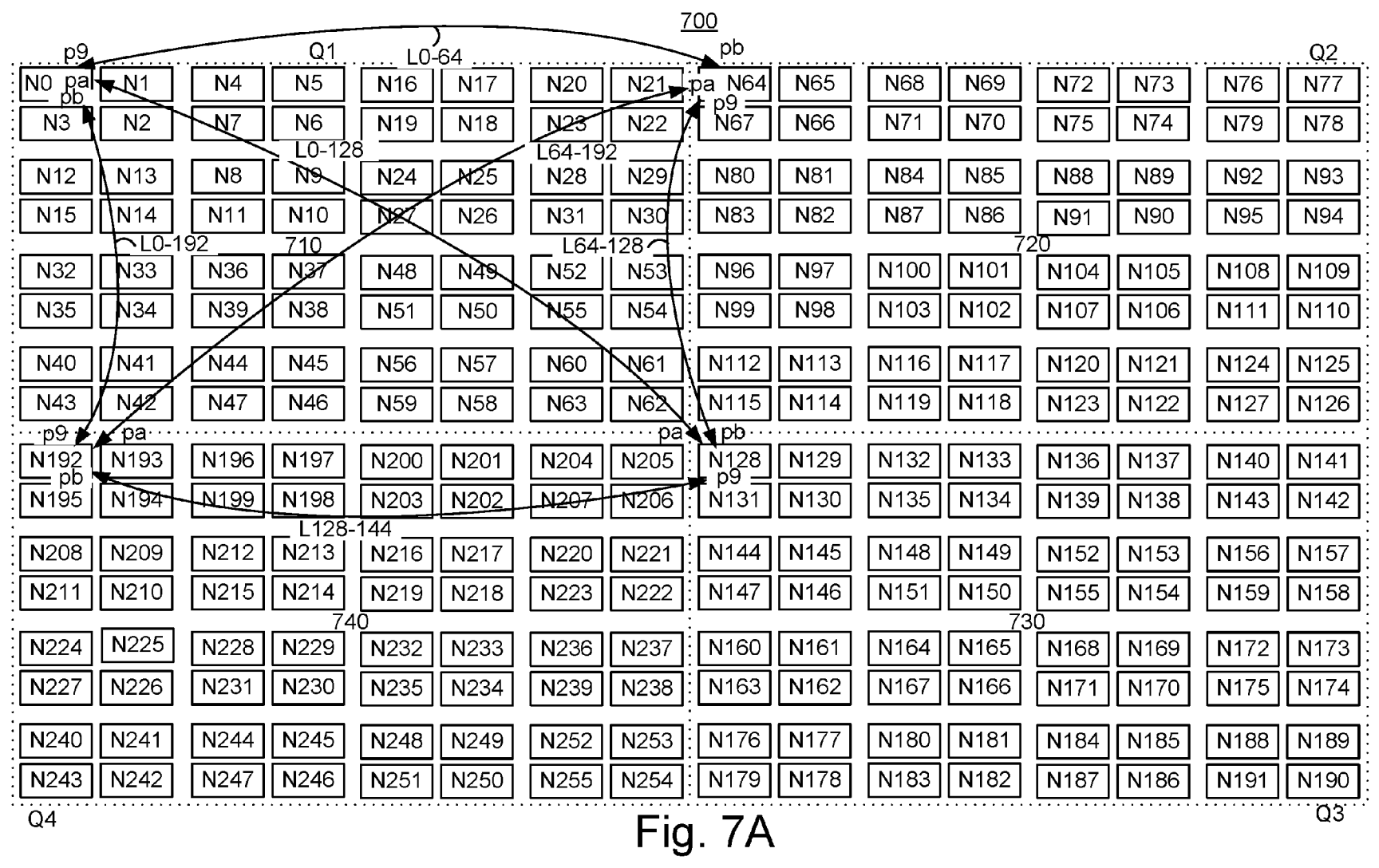

FIG. 7A depicts an example network 700 in a four-dimensional configuration which includes sixty-four quad full mesh networks, where communication links for N0, N64, N128 and N192 are depicted. The network includes sixty-four quad full mesh networks 710 (N0-N63), 720 (N64-N127), 730 (N128-N191) and 740 (N192-N255) in quarters Q1, Q2, Q3 and Q4, respectively. Example communication links for N0, N64, N128 and N192 are provided. Refer also to FIG. 7B, which depicts example node and routing port entries consistent with N0, N64, N128 and N192 of the network of FIG. 7A.

The node address entry x.0:64.x.x.x indicates N0 in Q1 is the sending node and N64 in Q2 is the destination node. Further, there are three null fields (x) after the node address and routing port address, indicating that the dimension is the fourth dimension, or D4. The routing port address entry x.9:b.x.x.x indicates p9 is the routing port in the sending node and pb is the routing port in the destination node. The associated communication link is L0-64.

The node address entry x.0:128.x.x.x indicates N0 in Q1 is the sending node and N128 in Q3 is the destination node. The routing port address entry x.a:a.x.x.x indicates pa is the routing port in the sending node and pa is the routing port in the destination node. The associated communication link is L0-128.

The node address entry x.0:192.x.x.x indicates N0 in Q1 is the sending node and N192 in Q4 is the destination node. The routing port address entry x.b:9.x.x.x indicates pb is the routing port in the sending node and p9 is the routing port in the destination node. The associated communication link is L0-192.

The remaining entries apply for communications when the sending node is N64, N128 or N192. The entries for the other nodes can follow the pattern described but are not listed for brevity.

FIG. 7C depicts example node and routing port entries for N0 as an example of the node and routing port entries 172a of FIG. 1B, and consistent with the examples of FIGS. 2B, 4B, 6B and 7B. Each node can be configured with tables of node and routing port entries for each dimension of the network. The node uses these tables to determine how to route a communication. Each node can be configured with the tables which involve routing through that node. In this example, N0 is an example node, and tables 750-753 are provided. The entries could alternatively be provided in one table. This approach conveniently provides the entries which are used for communications in the different dimensions. Each node may be configured with a respective set of node and routing port entries by the manager computer 105, as discussed.

Figure 8A:
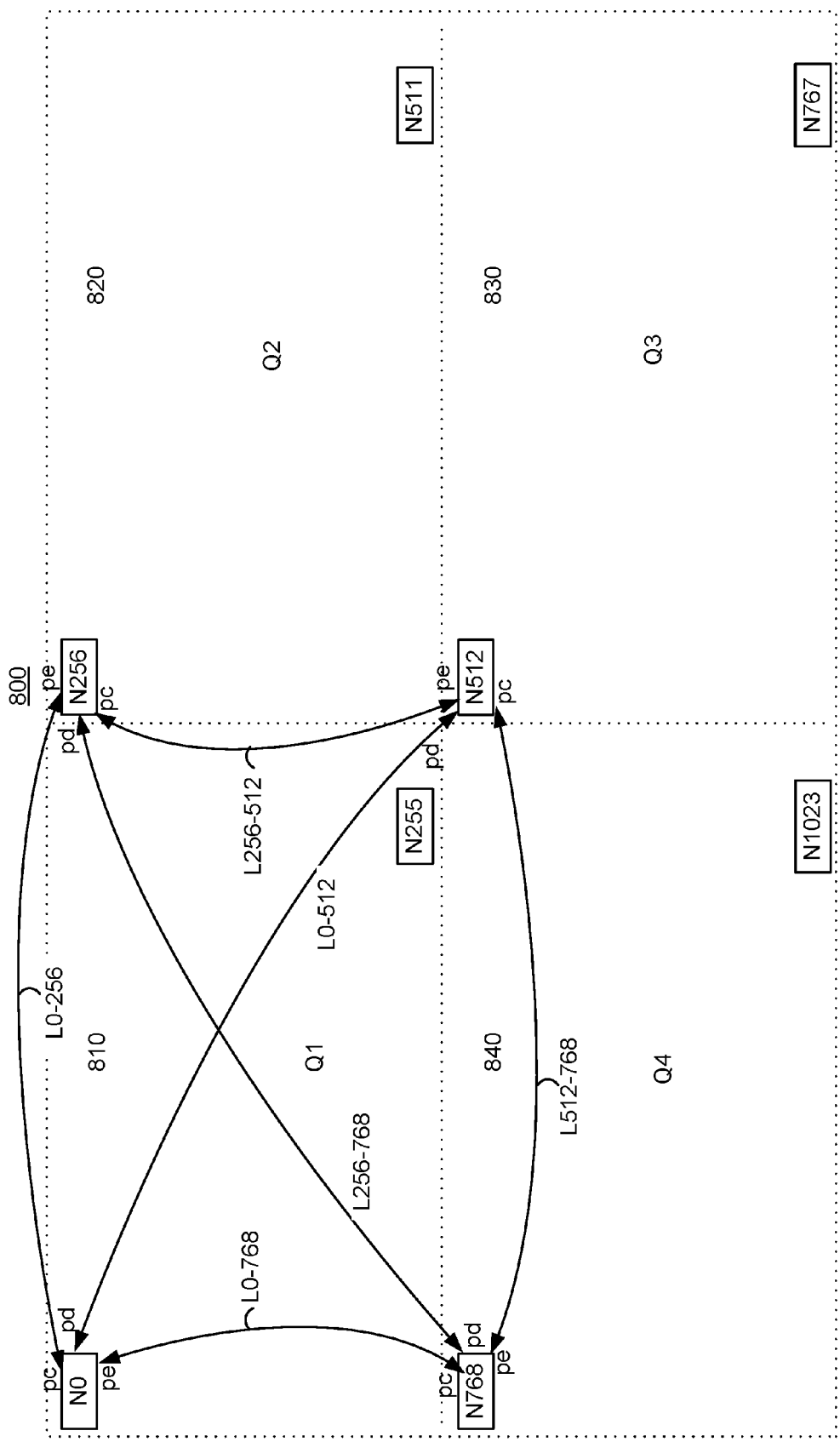
FIG. 8A depicts an example network in a five-dimensional configuration which includes 256 quad full mesh networks, where communication links for N0, N256, N512 and N768 are depicted.

FIG. 8A depicts an example network 800 in a five-dimensional configuration which includes 256 quad full mesh networks, where communication links for N0, N256, N512 and N768 are depicted. The network includes 256 quad full mesh networks 810 (N0-N255), 820 (N256-N511), 830 (N512-N767) and 840 (N768-N1023) in quarters Q1, Q2, Q3 and Q4, respectively. Example communication links for N0, N256, N512 and N768 are provided. Refer also to FIG. 8B, which depicts example node and routing port entries consistent with N0, N256, N512 and N768 of the network of FIG. 7A.

The node address entry 0:256.x.x.x.x indicates N0 in Q1 is the sending node and N256 in Q2 is the destination node. Further, there are four null fields (x) after the node address and routing port address, indicating that the dimension is the fifth dimension, or D5. The routing port address entry c:e.x.x.x.x indicates pc is the routing port in the sending node and pe is the routing port in the destination node. The associated communication link is L0-256.

The node address entry 0:512.x.x.x.x indicates N0 in Q1 is the sending node and N512 in Q3 is the destination node. The routing port address entry d:d.x.x.x.x indicates pd is the routing port in the sending node and pd is the routing port in the destination node. The associated communication link is L0-512.

The node address entry 0:768.x.x.x.x indicates N0 in Q1 is the sending node and N768 in Q4 is the destination node. The routing port address entry e:c.x.x.x.x indicates pe is the routing port in the sending node and pc is the routing port in the destination node. The associated communication link is L0-768.

The remaining entries apply for communications when the sending node is N256, N512 or N768. The entries for the other nodes can follow the pattern described but are not listed for brevity.

FIG. 9A depicts a table listing network dimension, number of nodes, number of quad full mesh networks, number of links or ports per node and maximum number of hops, consistent with FIG. 1A to 8B. For a dimension of N, where N is an integer of one or more, the number of nodes is $4^N$. The number of quad full mesh networks is one fourth of that value, or $4^{(N-1)}$. The total number of links or ports per node is 3*N. In a given dimension, the number of links or ports per node is 3. The maximum number of hops for the communication of a packet from a sending node to a destination node in a given dimension N is N. This means the packet passes through N-1 intermediate nodes which are between the sending node and the destination node. A hop represents a transmission over one communication link, from one node to another.

In one aspect, a data center includes $4^N$ nodes, wherein N is an integer number of at least 2, and $3*N*(4^N)$ communication links which connect the plurality of nodes. The nodes are arranged in $4^{(N-1)}$ quad full mesh networks. For each quad full mesh network, communication links connect each node to 3*(N-1) nodes in other quad full mesh networks, across all dimensions of the network.

Further, a different set of communication links is associated with each dimension, and progressively larger numbers of communication links are used for progressively larger values of the dimension. Each node is connected to each other node via no more than N communication links. Optionally, progressively longer communication links are used for progressively larger values of the dimension. This provides communication links with varying lengths in the network to minimize the number of hops between nodes. Generally, the lengths of the communication links over which a packet travels from a sending node to a destination node can be progressively shorter with each successive hop.

Each node comprises 3*N ports, and each port is connected to a respective one of the communication links.

In another aspect, an apparatus comprises: $4^N$ nodes, wherein N is an integer number of at least 2, and $3*N*(4^N)$ communication links which connect the plurality of nodes. The nodes are arranged in $4^{(N-1)}$ quad full mesh networks. The quad full mesh networks and the plurality of communication links are arranged in N dimensions, and in each dimension, the quad full mesh networks are arranged in four quarters and each node in one quarter is connected to one node in each of three other quarters of the four quarters.

FIG. 9B depicts a comparative example of a mesh network 900 comprising nodes N0-N10 arranged logically in X rows and X columns, where each node is connected to each of its neighbor nodes in a row and column. However, as discussed, in this approach, the number of hops between a sending node and a destination nodes is unnecessarily large. This network also does not provide advantages in terms of efficient scaling up and fault isolation, for example.

FIG. 9C depicts a table listing number of nodes, number of links or ports per node and maximum number of hops, consistent with FIG. 9B. In this example, there are sixteen nodes, three links or ports per node and the maximum number of hops is six. In comparison, FIG. 9A, for the analogous case of sixteen nodes, there are six links or ports per node and the maximum number of hops is two. The maximum number of hops is therefore reduced from six to two.

FIG. 10 depicts an example process for providing an N dimensional network. In one approach, the process is performed by the manager computer 105 and involved defining and distributing tables of node and routing port entries as described previously. A network can be provided by connecting nodes with communication links according to different dimensions, starting from a first dimension and concluding at a highest or Nth dimension. Step 1001 defines a table of node and routing port entries which provides communication links between routing ports of nodes to form quad full mesh networks. For example, with N dimensions, there are 4(N-1) quad full mesh networks. Step 1002 increments a dimension index n=2. At step 1003, for each group of $4^n$ nodes, a table node and routing port entries is defined which provides a communication link from each node in a quarter to one node in each of three other quarters. With n=2, for each group of 16 nodes, we provide a communication link from each node in a quarter to one node in each of three other quarters. Each quarter comprises four nodes, as in FIG. 4A.

A decision step 1004 determines if n is equal to the highest dimension of the network. If this is true (T), the manager computer distributes the tables of node and routing port entries to the respective nodes at step 1006. For example, FIG. 7C provides example tables for NO. If decision step 1004 is false (F), n is incremented by one at step 1005 and step 1003 is repeated. With n=3, for each group of 64 nodes, we provide a communication link from each node in a quarter to one node in each of three other quarters. Each quarter comprises sixteen nodes, as in FIG. 6A. With n=4, for each group of 256 nodes, we provide a communication link from each node in a quarter to one node in each of three other quarters. Each quarter comprises 64 nodes, as in FIG. 7A. With n=5, for each group of 1024 nodes, we provide a communication link from each node in a quarter to one node in each of three other quarters. Each quarter comprises 256 nodes, as in FIG. 8A. The process can be extended to larger values of n.

FIG. 11A depicts an example process for transmitting a packet in an N dimensional network. Step 1100 includes, at a sending node in one quad full mesh network, receiving a task such as a request for data. Step 1101 includes, at the sending node, obtaining an identification of a destination node in another quad full mesh network. The identification may be a destination node address. This destination node can assist in performing the task. As an example, user requests which arrive at the data center may be distributed to different nodes based on their availability. A node which receives a request may contact one or more other nodes to obtain data to fulfill the request. For instance, a request may be for a web page which is identified by a uniform resource locator (URL). The node may contact the manager computer to identify a node which has the data to fulfill the request. For instance, the node may send the URL or one or more fields in the URL to the manager computer. In response, the manager computer cross-references the URL fields to a particular node address, and returns this address as the destination node address. The destination node address may be an Internet Protocol (IP) address or Media Access Control (MAC) address, for instance. The manager computer may therefore act as an index server. The manager computer may also identify multiple nodes which can fulfill different parts of the request.

In another example, the manager computer monitors the availability of the nodes and may decide to take an action such as instructing a particular node to copy or move some of its data to another node. In this case, the manager computer provides the copy or move instruction and the destination node address to the particular node. In another example, a node can independently generate a request to another node (independent of the manager computer).

At step 1102, the sending node looks up routing ports from the table of node and routing port entries based on the addresses of the sending node and destination node, e.g., as in FIGS. 2B, 4B-4E, 6B, 7B and 8B. At step 1103, the sending node prepares a packet comprising a node address entry, a routing port address entry and a request, where the packet identifies a smallest dimension of the network which encompasses the sending and destination nodes. This is a dimension which is associated with the transmission. The request may be to provide certain data or to perform a task such as copy or move, for instance, as mentioned. Thus, based on the request that the sending node receives, it sends a packet with a related request to the destination node. At step 1104, the sending node transmits the packet toward the destination node. For example, this can include transmitting the packet via the sending node routing port. At step 1105, the packet may be routed using one or more intermediate nodes. Each node which receives a packet analyzes the header to determine if the node is the destination node. If it is not, the node determines a next node receive the packet. This could be the destination node or another intermediate node which will result in the minimum number of hops.

At step 1106, the destination node receives the packet and transmits an acknowledgement to the sending node. At step 1107, the destination node transmits the requested data or a confirmation of task completion to the sending node. In one implementation, a method for routing data includes: at a sending node in a data center, with the sending node configured with a sending node address, identifying a destination node address of a destination node to assist with a request, the sending node identifying a sending node routing port and a destination node routing port based on the sending node address and the destination node address, the sending node providing a node address entry and a routing port address entry in a packet, with the node address entry comprising the sending node address and the destination node address, and with the routing port address entry comprising the sending node routing port and the destination node routing port, and the sending node transmitting the packet from the sending node in one quad full mesh network among a plurality of quad full mesh networks in the data center toward the destination node in another quad full mesh network in the data enter using the node address entry and the routing port address entry, the packet identifying a smallest dimension of nodes which encompasses the sending node and the destination node among N dimensions of nodes in the data center, and N is an integer number of at least 2.

A corresponding apparatus for routing data includes: means for preparing a packet, means for transmitting the packet, means for determining whether the packet is successfully transmitted and means for, if the packet is not successfully transmitted, performing a diagnosis, as discussed above. The means may include, e.g., the components in FIG. 1B.

The packet is transmitted via no more than N communication links which are between the sending node and the destination node.

In each dimension, the plurality of quad full mesh networks are arranged in four quarters and each node in one quarter is connected to one node in each of three other quarters of the four quarters; and in the one dimension, the one quad full mesh network is in one quarter and the another quad full mesh network is in another quarter and the packet is transmitted from the one quarter to the another quarter using one communication link.

Further, in the smallest dimension which encompasses the sending node and the destination node, the packet is transmitted within the another quarter using no more than N−1 communication links.

In the node address entry, the one dimension is identified by a number of null data fields before and/or after a pair of data fields, where the pair of data fields comprises the sending node address in one data field and the destination node address in another data field.

If the packet is not successfully transmitted to the destination node, a method includes using the one dimension in a diagnosis involving nodes and associated communication links of the one dimension, the diagnosis excluding nodes and associated communication links of dimensions higher than the one dimension.

FIG. 11B depicts an example process for diagnosing a problem in an N dimensional network. Step 1110 includes determining that a packet is not successfully transmitted from the sending node to the receiving node. For example, a problem may occur in the transmission of a packet due to a checksum or other error correction data not having an expected value, a packet missing in a sequence of packets, or an acknowledgement not being received. Step 1111 identifies, from the packet or by other means, the smallest dimension of the network which encompasses the sending and destination nodes and the associated communication links. See also FIG. 12. Step 1112 performs a diagnosis of nodes and communication links associated with the one dimension (the smallest dimension which encompasses the sending and destination nodes), excluding nodes and communication links of higher dimensions. The diagnosis may include, e.g., testing the operation of the nodes and of the communication link such as by causing the transmission of test packets between nodes.

Figure 12:
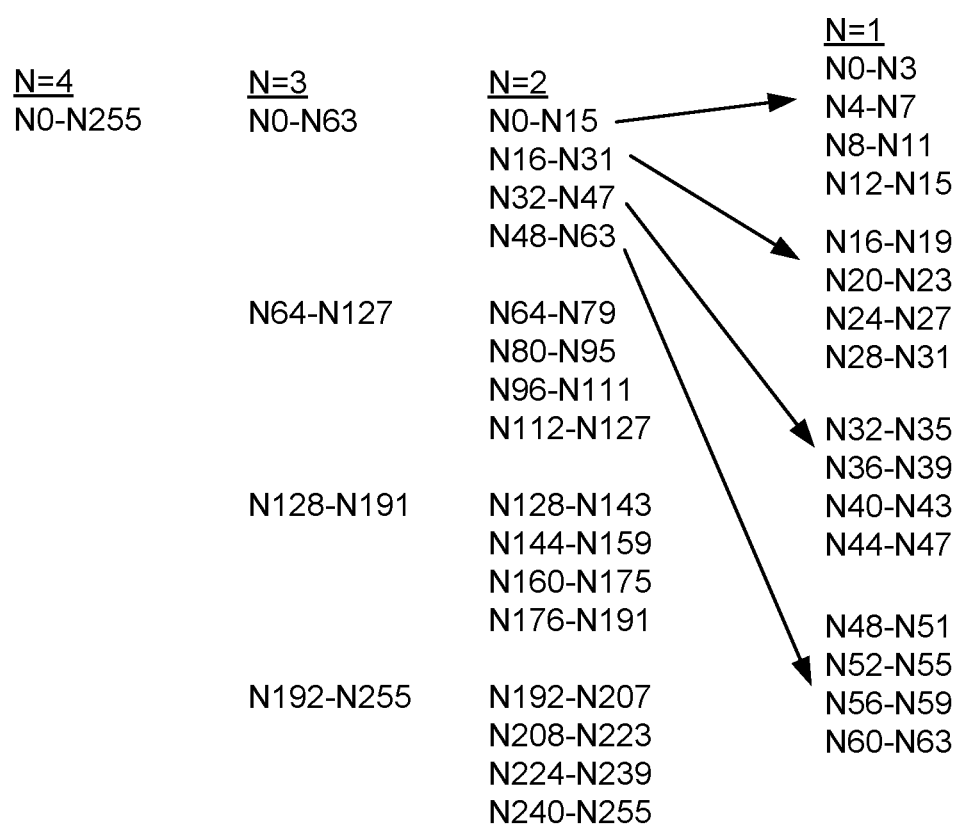
FIG. 12 depicts data used to identify the smallest dimension of a network which encompasses sending and destination nodes and associated communication links.

FIG. 12 depicts data used to identify the smallest dimension of a network which encompasses sending and destination nodes and associated communication links. In this example, N=4 is the highest dimension of the network, consistent with FIG. 7A. The highest dimension is N=4 if the nodes are encompassed by N0-N255 but not by a range of nodes in a smaller dimension, e.g., N=1, 2 or 3. The highest dimension is N=3 if the nodes are encompassed by one of four subsets of N0-N255, e.g., N0-N63, N64-N127, N128-N191 or N192-N255, but not by a range of nodes in a smaller dimension, e.g., N=1, 2.

The highest dimension is N=2 if the nodes are encompassed by one of four subsets of each of N0-N63, N64-N127, N128-N191 or N192-N255, but not by a range of nodes in a smaller dimension, e.g., N=1, 2. For example, the subsets of N0-N63 are N0-N15, N16-N31, N32-N47 and N48-N63, the subsets of N64-N127 are N64-N79, N80-N95, N96-N111 and N112-N127, the subsets of N128-N191 are N128-N143, N144-N159, N160-N175 and N176-N191, and the subsets of N192-N255 are N192-N207, N208-N223, N224-N239 and N240-N255.

The highest dimension is N=1 if the nodes are encompassed by one of four subsets of each of N0-N15, N16-N31, N32-N47 and N48-N63, N64-N79, N80-N95, N96-N111 and N112-N127, N128-N143, N144-N159, N160-N175 and N176-N191, and N192-N207, N208-N223, N224-N239 and N240-N255. As an example, the four subsets of N0-N15 are N0-N3, N4-N7, N8-N11 and N12-N15, the four subsets of N16-N31 are N16-N19, N20-N23, N24-N27 and N28-N31, the four subsets of N32-N47 are N32-N35, N36-N39, N40-N43 and N44-N47, and the four subsets of N48-N63 are N48-N51, N52-N55, N56-N59 and N60-N63.

Figure 13:
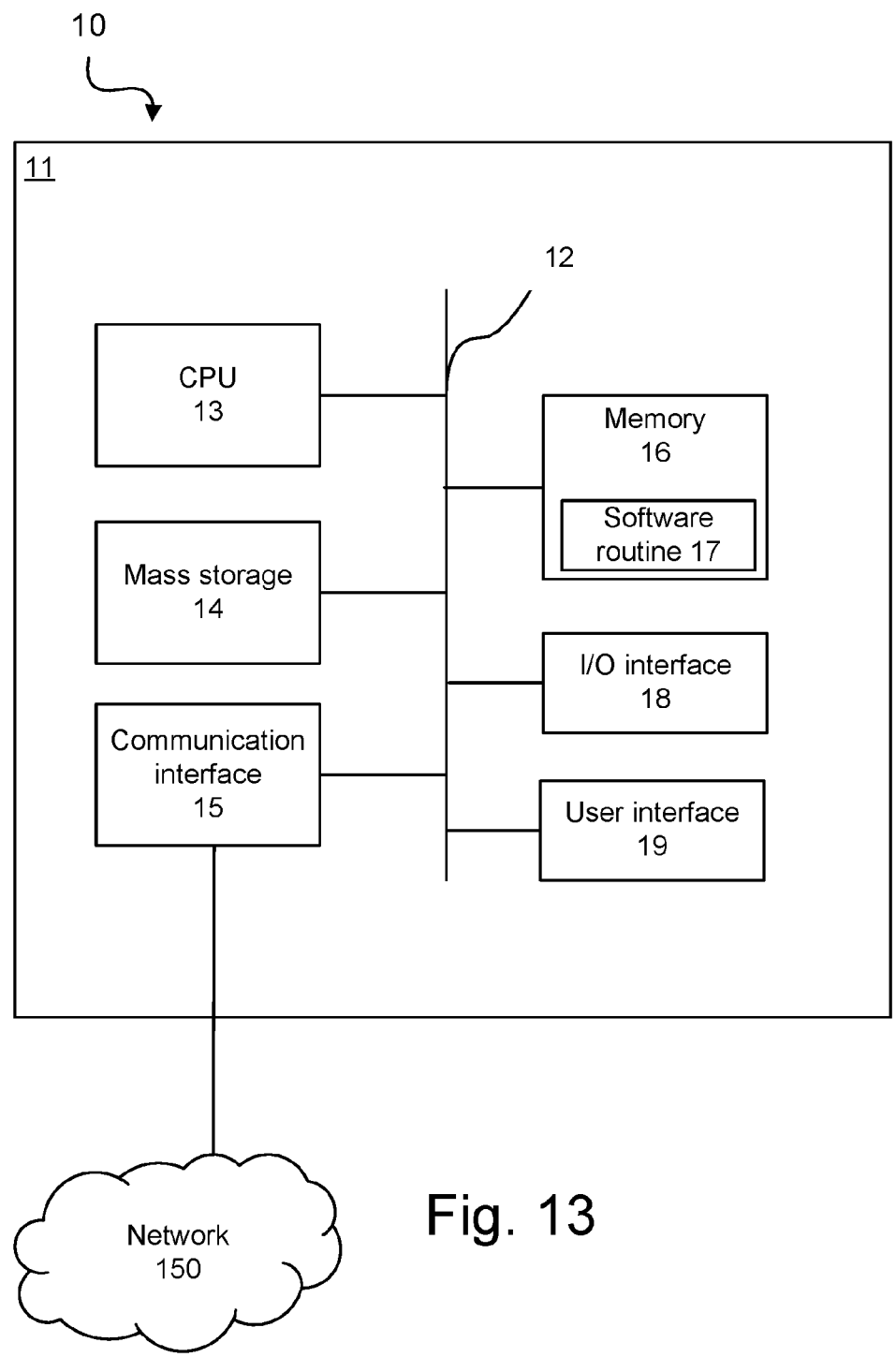
FIG. 13 depicts a block diagram of a network system that can be used to implement various embodiments.

FIG. 13 depicts a block diagram of a network system 10 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system 10 may comprise a processing unit 11 equipped with one or more input/output devices, such as network interfaces, storage interfaces, and the like. The processing unit 11 may include at least one central processing unit (CPU) 13, a memory 16, a mass storage device 14, and an I/O interface 18 connected to a bus 12. The bus 12 may be one or more of any type of several bus architectures including a memory bus or memory controller, a peripheral bus or the like.

The CPU 13 may comprise any type of electronic data processor. The memory 16 may comprise any type of system memory such as static random access memory (SRAM), dynamic random access memory (DRAM), synchronous DRAM (SDRAM), read-only memory (ROM), a combination thereof, or the like. In an embodiment, the memory 16 may include ROM for use at boot-up, and DRAM for program and data storage for use while executing programs. The programs may be provided as one or more software routines 17. The at least one CPU 13 can access and execute the one or more software routines 17. In embodiments, the memory 16 is non-transitory. The mass storage device 14 may comprise any type of storage device configured to store data, programs, and other information and to make the data, programs, and other information accessible via the bus. The mass storage device 14 may comprise, for example, one or more of a solid state drive, hard disk drive, a magnetic disk drive, an optical disk drive, or the like.

The processing unit 11 also includes one or more communication interfaces 15, which may comprise wired links, such as an Ethernet cable or the like, and/or wireless links to access nodes or one or more networks 150. The communication interface 15 allows the processing unit 11 to communicate with remote units via the network 150. For example, the communication interface 15 may provide wireless communication via one or more transmitters/transmit antennas and one or more receivers/receive antennas. In an embodiment, the processing unit 11 is coupled to a local-area network or a wide-area network for data processing and communications with remote devices, such as other processing units, the Internet, remote storage facilities, or the like.

A user interface 19 such as a graphical user interface is also provided to allow a user to configure and monitor the processing unit 11.

One example embodiment of FIG. 13 is provided in the data center of FIG. 1A. The software routine 17 can be configured to perform the functions of the data center 110 when the software routine is executed by the CPU 13. The processing unit 11/data center 110 can include a plurality of nodes comprising 4^N nodes, wherein N is an integer number of at least 2, and a plurality of communication links comprising 3*N*(4^N) communication links which connect the plurality of nodes. The nodes are arranged in 4^(N−1) quad full mesh networks, and each quad full mesh network comprises four nodes. Further, within each quad full mesh network, communication links connect each node to each other node. The quad full mesh networks and the plurality of communication links are arranged in N dimensions. In each dimension, each node of a quad full mesh network is connected to three other nodes of other quad full mesh networks via respective communication links.

Another example embodiment of FIG. 13 is provided in the node of FIG. 1B. The software routine 17 can be configured to perform the functions of the node 125 when the software routine is executed by the CPU 13. The processing unit 11/node 125 is in a data center which includes a plurality of nodes comprising 4^N nodes, wherein N is an integer number of at least 2, and a plurality of communication links comprising 3*N*(4^N) communication links which connect the plurality of nodes. The nodes are arranged in 4^(N−1) quad full mesh networks, each quad full mesh network comprises four nodes, and the quad full mesh networks and the plurality of communication links are arranged in N dimensions. Further, in each dimension, the quad full mesh networks are arranged in four quarters and each node in one quarter is connected to one node in each of three other quarters of the four quarters.

The techniques provided herein can be used with memory-centric storage of a data center which is compatible with current and future memory and communication technologies. The techniques are compatible with a very high speed, large scale of network clusters in a data center. The techniques allow the nodes and communication links to be classified geographically in a dynamic way with minimal latency. Nodes in each dimension have three communications links to provide full mesh connections. These links can be electrical, optical and/or wireless interfaces. All of the links and nodes can provide the same or different grades, levels of speed, or service per dimension. For example, applying a speed grade per dimension, the data center can be segmented into hot, warm and cold data service areas. Further, there is no limitation to scale out the size of the cluster. A new dimension of communication links can be created by adding three links per node.

The network provides a more organized way of geographically categorizing nodes and communication links. More effective fault isolation is also provided using the dimensional clustering technique. This allows geographical tasks and data service type assignments to be categorized based on the network dimension.

Any node to node communications will have a minimal routing process and number of hops, saving overall networking costs and power consumption. A lightweight high speed topological protocol can be used to handle dimension and speed grade information of a cluster or set of nodes.

Many applications are possible including a gigantic optical bus or backplane.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, numerous specific details are set forth in order to provide a thorough understanding. However, it will be clear to those of ordinary skill in the art that the embodiments may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data center, comprising:
a plurality of nodes comprising 4^N nodes, wherein N is an integer number of at least 2; and
a plurality of communication links comprising 3*N*(4^N) communication links which connect the plurality of nodes, wherein:
the nodes are arranged in 4^(N−1) quad full mesh networks;
each quad full mesh network comprises four nodes;
within each quad full mesh network, communication links connect each node to each other node;
the quad full mesh networks and the plurality of communication links are arranged in N dimensions; and
in each dimension, each node of a quad full mesh network is connected to three other nodes of other quad full mesh networks via respective communication links.

2. The data center of claim 1, wherein:
for each quad full mesh network, communication links connect each node to 3*(N−1) nodes in other quad full mesh networks.

3. The data center of claim 1, wherein:
a different set of communication links is associated with each dimension; and
progressively larger numbers of communication links connect are used for progressively larger values of the dimension.

4. The data center of claim 1, wherein:
a data rate of communication links in one of the dimensions is different than a data rate of communication links in another of the dimensions.
5. The data center of claim 1, wherein:
in each dimension, the quad full mesh networks are arranged in four quarters; and
each node in one quarter is connected to one node in each of three other quarters of the four quarters.
6. The data center of claim 5, wherein:
in a smallest dimension which encompasses a sending node and a destination node, one quad full mesh network is in one quarter and another quad full mesh network is in another quarter and a packet is transmitted from the one quarter to the another quarter using one communication link.
7. The data center of claim 6, wherein:
in the smallest dimension which encompasses the sending node and the destination node, the packet is transmitted within the another quarter using no more than N-1 communication links.
8. The data center of claim 1, wherein:
in one of the N dimensions, the quad full mesh networks are arranged in four quarters in which a service level of nodes in one of the quarters is different than a service level of nodes in another of the quarters.
9. The data center of claim 1, wherein:
in one of the N dimensions, the quad full mesh networks are arranged in four quarters in which a data rate of communication links for one of the quarters is different than a data rate of communication links for another of the quarters.
10. The data center of claim 9, wherein:
the different data rates are provided by different communication link media.
11. The data center of claim 1, wherein:
each node is connected to each other node via no more than N communication links.
12. The data center of claim 1, wherein:
each node comprises 3*N ports; and
each port is connected to a respective one of the communication links.
13. A method for routing data, comprising:
a sending node in a data center, with the sending node configured with a sending node address, identifying a destination node address of a destination node to assist with a request;
the sending node identifying a sending node routing port and a destination node routing port based on the sending node address and the destination node address;
the sending node providing a node address entry and a routing port address entry in a packet, with the node address entry comprising the sending node address and the destination node address, and with the routing port address entry comprising the sending node routing port and the destination node routing port; and
the sending node transmitting the packet from the sending node in one quad full mesh network among a plurality of quad full mesh networks in the data center toward the destination node in another quad full mesh network in the data enter using the node address entry and the routing port address entry, the packet identifying a smallest dimension of nodes which encompasses the sending node and the destination node among N dimensions of nodes in the data center, and N is an integer number of at least 2.
14. The method of claim 13, wherein:
the plurality of quad full mesh networks and a plurality of communication links which connect the nodes are arranged in the N dimensions.
15. The method of claim 13, further comprising:
transmitting the packet via no more than N communication links between the sending node and the destination node.
16. The method of claim 13, wherein:
in each dimension, a plurality of quad full mesh networks are arranged in four quarters and each node in one quarter is connected to one node in each of three other quarters of the four quarters; and
in the smallest dimension which encompasses the sending node and the destination node, the one quad full mesh network is in one quarter and the another quad full mesh network is in another quarter and the packet is transmitted from the one quarter to the another quarter using one communication link.
17. The method of claim 16, further comprising:
in the smallest dimension which encompasses the sending node and the destination node, transmitting the packet within the another quarter using no more than N-1 communication links.
18. The method of claim 13, wherein:
the node address entry comprises a set of data fields, the set of data fields comprises a pair of data fields and one or more null data fields, the pair of data fields comprises the sending node address and the destination node address, and the smallest dimension which encompasses the sending node and the destination node is identified by a position of the pair of data fields within the set of data fields.
19. The method of claim 13, wherein:
the routing port address entry comprises a set of data fields, the set of data fields comprises a pair of data fields and one or more null data fields, the pair of data fields comprises the sending node routing port and the destination node routing port, and the smallest dimension which encompasses the sending node and the destination node is identified by a position of the pair of data fields within the set of data fields.
20. The method of claim 13, further comprising:
the sending node determining whether the packet is successfully transmitted to the destination node; and
the sending node performing a diagnosis using nodes and associated communication links of the smallest dimension which encompasses the sending node and the destination node if the packet is not successfully transmitted to the destination node.
21. The method of claim 20, wherein:
the diagnosis excludes nodes and associated communication links of dimensions higher than the smallest dimension which encompasses the sending node and the destination node.

* * * * *